(12) United States Patent
Shiba

(10) Patent No.: US 11,125,870 B2
(45) Date of Patent: Sep. 21, 2021

(54) MOVING-TARGET DETECTION SYSTEM AND MOVING-TARGET DETECTION METHOD

(71) Applicant: NEC CORPORATION, Tokyo (JP)

(72) Inventor: Hisashi Shiba, Tokyo (JP)

(73) Assignee: NEC CORPORATION, Tokyo (JP)

( * ) Notice: Subject to any disclaimer, the term of this patent is extended or adjusted under 35 U.S.C. 154(b) by 227 days.

(21) Appl. No.: 16/328,016

(22) PCT Filed: Aug. 23, 2017

(86) PCT No.: PCT/JP2017/030015
§ 371 (c)(1),
(2) Date: Feb. 25, 2019

(87) PCT Pub. No.: WO2018/038128
PCT Pub. Date: Mar. 1, 2018

(65) Prior Publication Data
US 2019/0195999 A1 Jun. 27, 2019

(30) Foreign Application Priority Data
Aug. 26, 2016 (JP) .............................. JP2016-166005

(51) Int. Cl.
*G01S 13/50* (2006.01)
*G01S 13/524* (2006.01)
(Continued)

(52) U.S. Cl.
CPC ............ *G01S 13/505* (2013.01); *G01S 13/24* (2013.01); *G01S 13/34* (2013.01); *G01S 13/524* (2013.01);
(Continued)

(58) Field of Classification Search
CPC ........ G01S 13/505; G01S 13/34; G01S 13/24; G01S 13/536; G01S 13/56; G01S 13/581; G01S 13/524
(Continued)

(56) References Cited

U.S. PATENT DOCUMENTS 5,075,695 A * 12/1991 Baghdady ................. G01S 3/14
342/433
5,216,477 A * 6/1993 Korb ....................... G01S 17/58
356/28.5
(Continued)

FOREIGN PATENT DOCUMENTS

JP 63-199527 A 8/1988
JP 4-64080 A 2/1992
(Continued)

OTHER PUBLICATIONS

Jie Zhen, Zhenhua Zhang and Shunjun Wu, "A numeric range migration algorithm of space- surface bistatic SAR," 2009 IET International Radar Conference, Guilin, 2009, pp. 1-4, doi: 10.1049/cp.2009.0421. (Year: 2009).*

(Continued)

*Primary Examiner* — Vladimir Magloire
*Assistant Examiner* — Alexander L. Syrkin
(74) *Attorney, Agent, or Firm* — Sughrue Mion, PLLC

(57) ABSTRACT

In order to enhance the performance with which a moving target is detected by a single sensor and with a degree of freedom in a transmission waveform, a moving-target detection system 1 has a transmission waveform setting means 101 for setting a transmission waveform St(t), a transmission means 102 for transmitting a wave having the set transmission waveform St(t), a reception means 103 for receiving a wave including a reflected wave from a target, a Doppler shift estimation means 104 for estimating a Doppler (Continued)

shift that occurs due to movement of the target from the transmission waveform St(t) and a reception waveform Sr(t) including the reflected wave, a transmission waveform deformation means 105 for generating a deformed transmission waveform in which the transmission waveform St(t) is deformed in accordance with the estimated Doppler shift, and a target sensing means 106 for sensing the target using the deformed transmission waveform.

14 Claims, 17 Drawing Sheets

(51) Int. Cl.
*G01S 13/56* (2006.01)
*G01S 13/58* (2006.01)
*G01S 13/34* (2006.01)
*G01S 13/24* (2006.01)
*G01S 13/536* (2006.01)

(52) U.S. Cl.
CPC ............ *G01S 13/536* (2013.01); *G01S 13/56* (2013.01); *G01S 13/581* (2013.01)

(58) Field of Classification Search
USPC .......................................................... 342/28
See application file for complete search history.

(56) References Cited

U.S. PATENT DOCUMENTS

| | | | | |
|---|---|---|---|---|
| 5,646,623 | A * | 7/1997 | Walters ................... | G01S 13/32 342/112 |
| 6,674,395 | B2 * | 1/2004 | Nakanishi ............. | G01S 7/4008 342/109 |
| 9,223,021 | B2 * | 12/2015 | Goldman ............... | G01S 3/8006 |
| 10,126,418 | B1 * | 11/2018 | Campbell ............. | G01S 13/931 |
| 2002/0186161 | A1 | 12/2002 | Szajnowski | |
| 2005/0168378 | A1 * | 8/2005 | Honda ..................... | G01S 13/24 342/109 |
| 2005/0192719 | A1 * | 9/2005 | Sheikh ...................... | B64G 1/36 701/13 |
| 2005/0200833 | A1 * | 9/2005 | Nakamura ............... | G01S 17/86 356/4.07 |
| 2006/0239367 | A1 * | 10/2006 | Wilhelmsson .... | H04L 25/03006 375/260 |
| 2007/0165752 | A1 * | 7/2007 | Warner ............... | H04L 27/0014 375/346 |
| 2007/0211827 | A1 * | 9/2007 | Baggen ............... | H04L 27/2602 375/316 |
| 2007/0297522 | A1 * | 12/2007 | Baggen ............... | H04L 27/2647 375/260 |
| 2011/0193738 | A1 * | 8/2011 | Comic .................. | G01S 13/584 342/27 |
| 2015/0042511 | A1 * | 2/2015 | Miller ..................... | G01S 19/29 342/357.51 |

FOREIGN PATENT DOCUMENTS

| | | | |
|---|---|---|---|
| JP | 11-109027 A | | 4/1999 |
| JP | 2000-111646 A | | 4/2000 |
| JP | 2001-296360 A | | 10/2001 |
| JP | 2003-004842 A | | 1/2003 |
| JP | 2003-130949 A | | 5/2003 |
| JP | 2005-517190 A | | 6/2005 |
| JP | 2011-38993 A | | 2/2011 |
| JP | 2011-237338 A | | 11/2011 |
| JP | 2011237338 A | * | 11/2011 |
| JP | 2012-168122 A | | 9/2012 |
| JP | 2015-17942 A | | 1/2015 |
| JP | 2017-53721 A | | 3/2017 |
| JP | 2017-198514 A | | 11/2017 |
| SU | 1675905 A1 | * | 9/1991 |
| WO | WO-2017178055 A1 | * | 10/2017 ........... H04L 27/266 |
| WO | 2017/187815 A1 | | 11/2017 |

OTHER PUBLICATIONS

Z. Huang, B. Tang and S. Zhang, "Sequential optimisation of orthogonal waveforms for MIMO radar," in The Journal of Engineering, vol. 2019, No. 21, pp. 7912-7917, Nov. 2019, doi: 10.1049/joe.2019.0753. (Year: 2019).*

E. Bishop, R. Linnehan and A. Doerry, "Video-SAR using higher order Taylor terms for differential range," 2016 IEEE Radar Conference (RadarConf), Philadelphia, PA, 2016, pp. 1-4, doi: 10.1109/RADAR.2016.7485169. (Year: 2016).*

D. Rhodes, "The optimum line source for the best mean-square approximation to a given radiation pattern," in IEEE Transactions on Antennas and Propagation, vol. 11, No. 4, pp. 440-446, Jul. 1963, doi: 10.1109/TAP.1963.1138075. (Year: 1963).*

Communication dated Dec. 3, 2019, from the Japanese Patent Office in counterpart application No. 2018-535715.

Jan J. Kroszczynski, "Pulse Compression by Means of Linear Period Modulation", Proceedings of IEEE, Jul. 1969, pp. 1260-1266, vol. 57, No. 7.

International Search Report for PCT/JP2017/030015 dated Nov. 21, 2017 [PCT/ISA/210].

Written Opinion for PCT/JP2017/030015 dated Nov. 21, 2017 [PCT/ISA/237].

* cited by examiner

MOVING-TARGET DETECTION SYSTEM AND MOVING-TARGET DETECTION METHOD

CROSS REFERENCE TO RELATED APPLICATIONS

This application is a National Stage of International Application No. PCT/JP2017/030015 filed Aug. 23, 2017, claiming priority based on Japanese Patent Application No. 2016-166005 filed Aug. 26, 2016, the disclosure of which is incorporated herein in its entirety by reference.

TECHNICAL FIELD

The present invention relates to a moving-target detection system and a moving-target detection method.

BACKGROUND ART

A moving-target detection system is a system which transmits a wave such as an electromagnetic wave, a sound wave, or a light wave, and then detects a moving target by a reflected wave from the target. A representative example of a system which transmits an electromagnetic wave and then detects a target by a reflected wave from the target is a radar. A representative example of a system which transmits a sound wave and then detects a target by a reflected wave from the target is a sonar. A representative example of a system which transmits a light wave and then detects a target by a reflected wave from the target is a lidar. These systems each transmit a modulated transmission wave, take a cross correlation between a transmission wave and a reception wave, and identify a target by a degree of strength of the correlation. This cross correlation is called pulse compression or replica correlation. Herein, this cross correlation is representatively called replica correlation.

When a target is moving, a wave reflected from the target causes a Doppler shift due to a Doppler effect. A case with a constant frequency is considered, and it is assumed that a transmission frequency is $F_0$, a velocity of a wave is c, and when a direction from a sensor such as a radar or a sonar to a target is positive, a velocity component of the sensor for a direction of the sensor→the target is $v_s$. It is also assumed that a velocity component of the target for a direction of the sensor→the target is $v_o$. It is assumed that (i.e., $v_s$ is positive when a sensor has a velocity moving toward a target, and $v_o$ is positive when a target has a velocity component moving away from a sensor). In this instance, a frequency $F_1$ of a wave, which a target receives, is as follows.

$$F_1 = \frac{c - v_o}{c - v_s} F_o$$

Next, by considering from an opposite standpoint, a frequency of a sound wave reflected from a target is considered. It is assumed that a target is a wave source, a direction from a target to a sensor is positive, a velocity component of a target for the direction is $v_s'$, and a velocity component of a sensor (observer) is $v_o'$. Because a frequency in a target being a wave source (reflected wave) in this case is $F_1$, a frequency $F_2$ of a reflected wave, which a sensor receives, is as follows.

$$F_2 = \frac{c - v_o'}{c - v_s'} F_1$$

$$v_s' = -v_o$$

Since $v_s' = -v_o$ and $v_o' = -v_s$ are established, $$F_2 = \frac{c + v_s}{c + v_o} F_1 = \frac{c + v_s}{c + v_o} \cdot \frac{c - v_o}{c - v_s} F_o$$

In other words, as a coefficient of a Doppler shift, $$\eta = \frac{c + v_s}{c + v_o} \cdot \frac{c - v_o}{c - v_s}$$

is established.

For reference, in the case of $c \gg |v_o|$ and $c \gg |v_s|$, when terms of second and higher orders are neglected for $v_o/c$ and $v_s/c$, $$\eta = \frac{c + v_s}{c + v_o} \cdot \frac{c - v_o}{c - v_s} = \frac{1 + \frac{v_s}{c}}{1 + \frac{v_o}{c}} \cdot \frac{1 + \frac{v_o}{c}}{1 - \frac{v_s}{c}} \cong \left(1 + \frac{v_s}{c}\right)^2 \left(1 - \frac{v_o}{c}\right)^2 \cong 1 + \frac{2(v_s - v_o)}{c}$$

is obtained, and the above equation becomes a frequently seen table equation. $v_s - v_o$ is a relative velocity between a sensor and a target.

In the case of a high S/N ratio, which of received reception waves is a reflected wave from a target is clear, and deformation, from a transmission wave, of a reception wave reflected from a target can be easily recognized. Therefore, a Doppler shift can be easily obtained, and a position of a moving target can be sensed.

A technique for detecting a moving target by a reflected wave from the target is disclosed in, for example, Patent Literature 1(PTL1). PTL1 discloses a radar system which calculates a time difference of arrival TDOA, a frequency difference of arrival FDOA, and other information from a direct RF signal and a reflected RF signal, and thus senses and tracks a position of a target object.

CITATION LIST

Patent Literature

[PTL1] Japanese Translation of PCT International Application Publication No. 2005-517190

Non Patent Literature

[NPL] JAN J. KROSZCZYNSKI, "Pulse Compression by Means of Linear Period Modulation", PROCEEDINGS OF IEEE, VOL. 57, NO. 7, JULY 1969, pp.1260-1266.

SUMMARY OF INVENTION

Technical Problem

However, in the case of a low S/N ratio, which part of a received reception wave includes a reflected wave from a target becomes unclear. Moreover, even when a position of a target is recognized, it is also difficult, due to an influence of noise, to estimate a Doppler shift from a shape of a signal. In such a situation, there is a problem that it becomes difficult to detect a target.

PTL1 is practical with a plurality of sensors (a plurality of radars), and does not disclose anything practical with a single sensor (a single radar or sonar). In addition, PTL1 does not disclose a technique for being capable of ensuring performance of detecting a moving target even in the case of a low S/N ratio.

In order to solve this problem, there is an approach of transmitting with a waveform which is not subject to an influence of a Doppler shift. For example, Non Patent Literature 1(NPL1) discloses a modulation method referred to as linear period modulation (LPM) being capable of reducing an influence of a Doppler shift.

However, with the technique disclosed in NPL1, there is inconvenience that a transmission waveform cannot be freely selected. On the other hand, a method of preparing replicas previously assuming a plurality of patterns of Doppler shifts is conceivable. However, there is a problem that, when an attempt is made to raise frequency resolution, a number of replicas increases, and thus a calculation load increases. For example, in the case of a sonar, when it is assumed that a velocity of a target is within a range of ±30 kt in a visual line direction, and a replica suited to a velocity of a target is prepared at intervals of 1 kt, 61 replicas are prepared, and thereby a calculation load becomes 61 times.

An object of the present invention is to provide a moving-target detection system and a moving-target detection method having a degree of freedom in a transmission waveform and being capable of improving performance of detecting a moving target, even with a single sensor.

Solution to Problem

A moving-target detection system according to an aspect of the present invention includes: a transmission waveform setting means for setting a transmission waveform; a transmission means for transmitting a wave having the set transmission waveform; a reception means for receiving a wave including a reflected wave from a target; a Doppler shift estimation means for estimating a Doppler shift that occurs due to movement of the target, from the transmission waveform and a reception waveform of a wave including the reflected wave; a transmission waveform deformation means for generating a deformed transmission waveform in which the transmission waveform is deformed, according to the estimated Doppler shift; and a target sensing means for sensing a target by using the deformed transmission waveform.

A moving-target detection method according to the other aspect of the present invention includes: setting a transmission waveform; transmitting a wave having a set transmission waveform; receiving an entering wave including a reflected wave from a target; estimating a Doppler shift of a received wave that occurs due to movement of a target, from a transmission waveform and a received waveform; generating a deformed transmission waveform in which a transmission waveform is deformed, according to an estimated Doppler shift; and sensing a target by using a deformed transmission waveform.

A recording medium according to further the other aspect of the present invention, for recording program causing a computer to execute: processing of setting a transmission waveform; processing of transmitting a wave having a set transmission waveform; processing of receiving an entering wave including a reflected wave from a target; processing of estimating a Doppler shift of a received wave that occurs due to movement of a target, from a transmission waveform and a received waveform; processing of generating a deformed transmission waveform in which a transmission waveform is deformed, according to an estimated Doppler shift; and processing of sensing a target by using a deformed transmission waveform.

Advantageous Effects of Invention

According to each of the above-described aspects of the present invention, it is possible to provide a moving-target detection system and a moving-target detection method having a degree of freedom in a transmission waveform and being capable of improving performance of detecting a moving target, even with a single sensor.

EXAMPLE EMBODIMENT

Next, example embodiments of the present invention will be described in detail with reference to the drawings.

Figure 1:
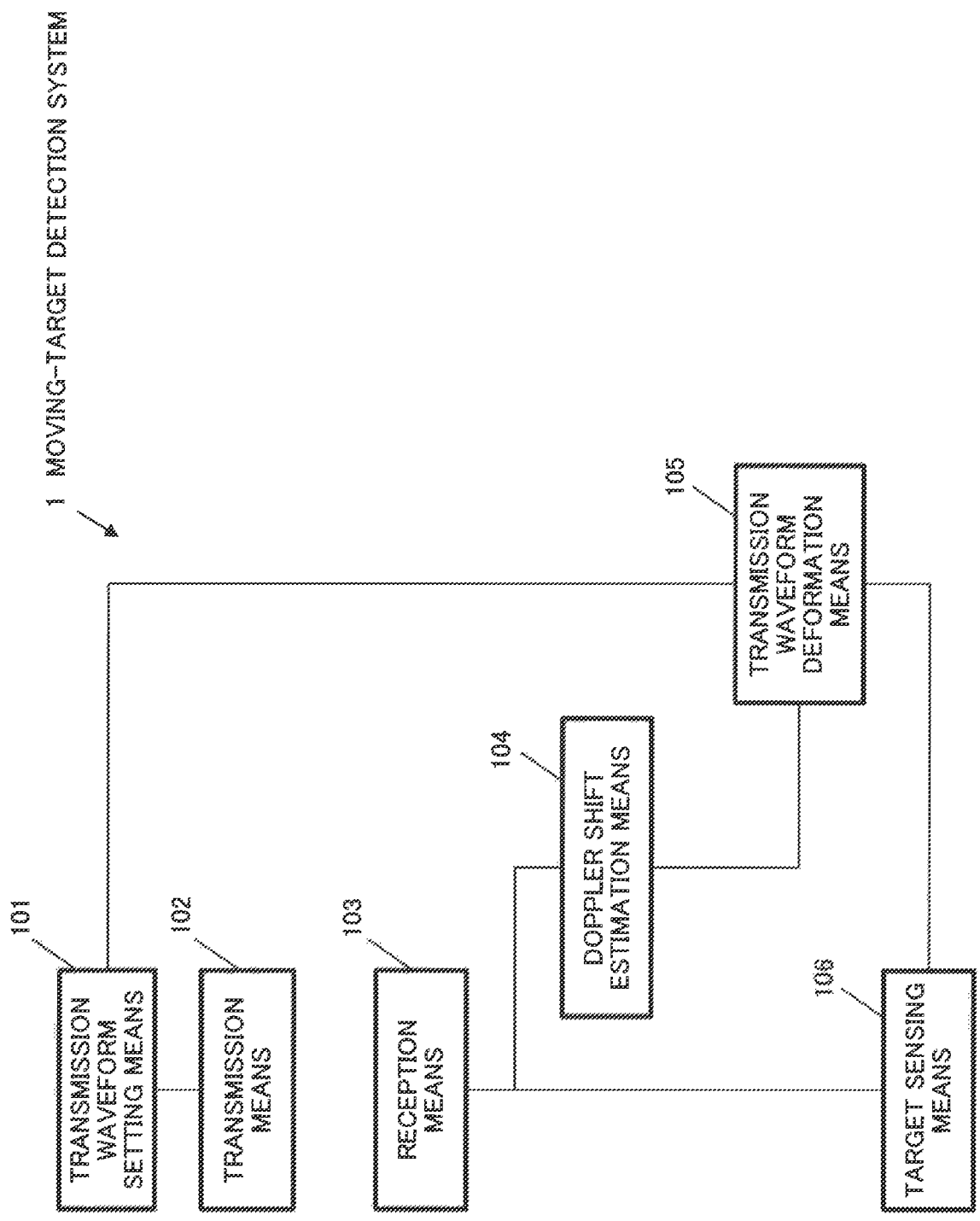
FIG. 1 is a block diagram illustrating a configuration according to a first example embodiment of the present invention.

FIG. 1 is a block diagram illustrating a configuration according to a first example embodiment of the present invention. Referring to FIG. 1, a moving-target detection system 1 according to the present invention includes a transmission waveform setting means 101 with which a user sets a transmission waveform in advance, and a transmission means 102 for transmitting a wave having a specified transmission waveform. The moving-target detection system 1 also includes a reception means 103 for receiving a wave including at least a reflected wave from a target, and a Doppler shift estimation means 104 for estimating a Doppler shift of a target from a reception waveform of the received wave before sensing the target. The moving-target detection system 1 also includes a transmission waveform deformation means 105 for generating a deformed transmission waveform in which a transmission waveform is deformed in accordance with an estimated Doppler shift, and a target sensing means 106 for sensing a target by referring to a reception waveform of the received wave, with a Doppler-shifted deformed transmission waveform as a replica of the transmission waveform used for correlation When a user sets a transmission waveform with, for example, a keyboard of the moving-target detection system 1, the transmission waveform setting means 101 stores the set transmission waveform.

The transmission means 102 may include an electric circuit, which is configured to convert a digital electric signal into an analog electric signal, and a transmitter. For example, in the case of a sonar, the transmission means 102 includes a transmitter/receiver which converts an analog electric signal into a sound signal, and, after the electric circuit converts a transmission waveform stored in the transmission waveform setting means 101 into an analog electric signal, a sound wave is transmitted into the sea from the transmitter/receiver. For example, in the case of a radar, the transmission means 102 includes an antenna, and, after the electric circuit converts a transmission waveform stored in the transmission waveform setting means 101 into an analog electric signal, an electromagnetic wave is transmitted into the air from the antenna.

The reception means 103 is configured from a receiver, and an electric circuit which converts an analog electric signal output from the receiver into a digital electric signal (hereinafter, referred to as a reception signal). For example, in the case of a sonar, the reception means 103 includes a transmitter/receiver which converts a sound wave from the sea into an analog electric signal. The electric circuit converts, into a digital electric signal, an analog electric signal resulting from conversion of an undersea sound wave received by the transmitter/receiver and emitted by the transmission means 102 including reflection from a target, and then outputs the digital electric signal. For example, in the case of a radar, the reception means 103 includes an antenna, and the electric circuit converts, into a digital electric signal, an analog electric signal resulting from conversion of an electromagnetic wave received by the antenna, and then outputs the digital electric signal.

The Doppler shift estimation means 104 estimates a Doppler shift, based on a reception signal output from the reception means 103. The Doppler shift estimation means 104 specifically estimates, for example, a coefficient $\eta$ of a Doppler shift.

The transmission waveform deformation means 105 then generates a transmission waveform (hereinafter, referred to as a deformed transmission waveform) deformed by a Doppler shift, based on a Doppler shift estimated by the Doppler shift estimation means 104, and the transmission waveform setting means 101 stores the deformed transmission waveform.

For a waveform (hereinafter, referred to as a reception waveform) of a reception signal, the target sensing means 106 performs correlation processing with the deformed transmission waveform stored in the transmission waveform deformation means 105. Then, for example, when a correlation value obtained by the correlation processing is more than a previously stored threshold value, the target sensing means 106 determines that a target is present. When determining that a target is present, the target sensing means 106 calculates a position of the target, and displays the position of the target with a polar coordinate around the reception means 103, on a display of the moving-target detection system 1. The target sensing means 106 may display a position of a target, on a display, with a coordinate in which a horizontal axis indicates an azimuth, and a vertical axis indicates a distance.

Figure 16:
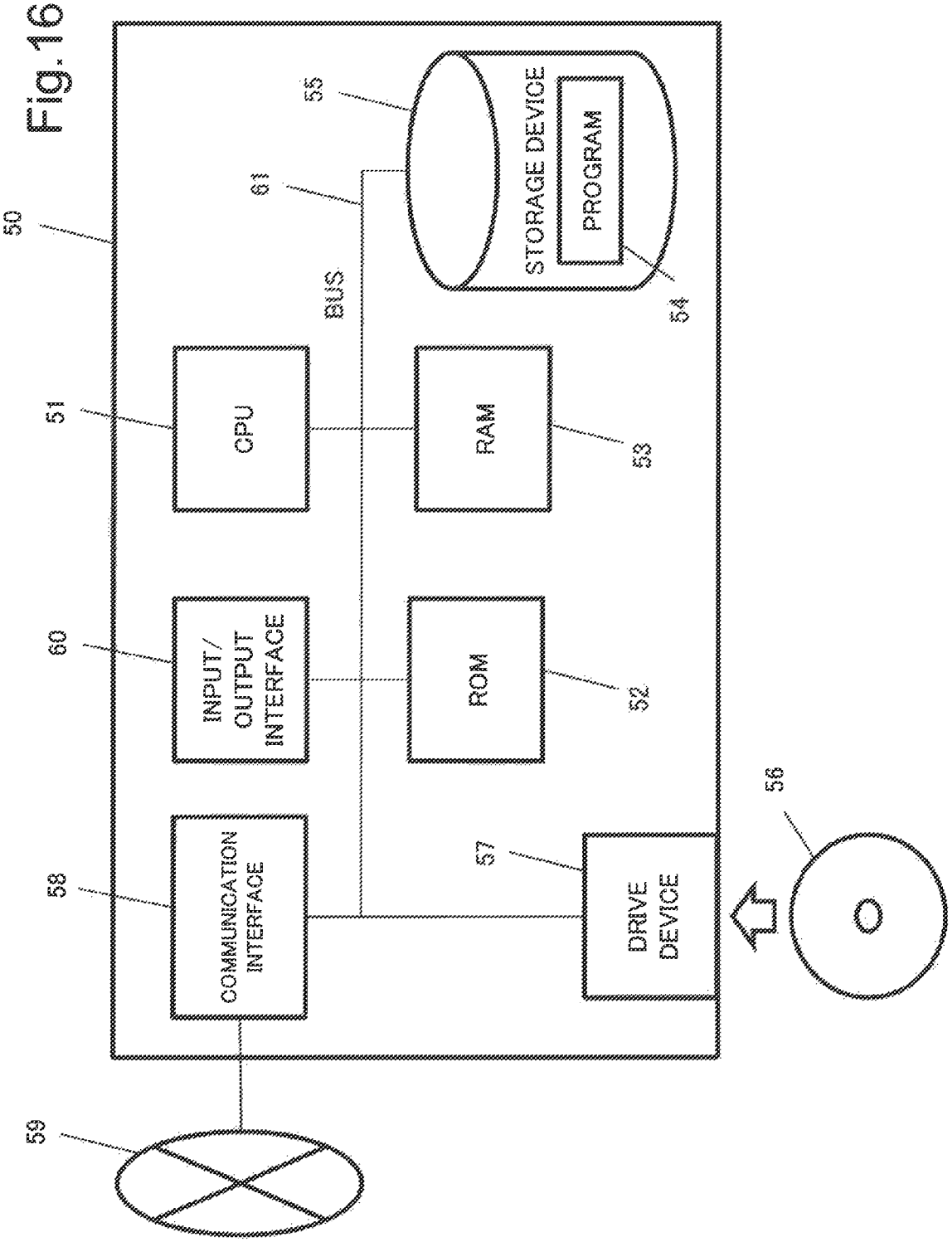
FIG. 16 is a diagram illustrating one example of a configuration of an information processing device which achieves each unit according to each example embodiment.

Note that each component of each of the moving-target detection systems according to the first example embodiment illustrated in FIG. 1 and other example embodiments described later indicates a block of a functional unit. A part or the whole of each component of the moving-target detection system according to each example embodiment may be achieved by, for example, a given combination of an information processing device 50 and a program as illustrated in FIG. 16. The information processing device 50 includes the following configuration as one example.

A central processing unit (CPU) 51
A read only memory (ROM) 52
A random access memory (RAM) 53
A program 54 loaded onto the RAM 53
A storage device 55 saving the program 54
A drive device 57 which reads and writes in a recording medium 56
A communication interface 58 connected to a communication network 59
An input/output interface 60 which inputs and outputs data
A bus 61 which connects each component Each component according to each example embodiment is achieved by acquiring and executing, by the CPU 51, the program 54 which achieves a function of each component. For example, in the example of the moving-target detection system 1 in FIG. 1, the CPU 51 which has acquired the program 54 stores a transmission waveform set via the input/output interface 60 in the drive device 57 or the like, and thereby the transmission waveform setting means 101 may achieve a function. Moreover, the CPU 51 which has acquired the program 54 converts a transmission waveform stored in the drive device 57 or the like into an analog electric signal and outputs the analog electric signal, and thereby the transmission means 102 may achieve a function. Moreover, the CPU 51 which has acquired the program 54 converts an input analog electric signal into a digital electric signal, and thereby the reception means 103 may achieve a function. Moreover, the CPU 51 which has acquired the program 54 estimates a Doppler shift, based on a reception signal, and thereby the Doppler shift estimation means 104 may achieve a function. Moreover, the CPU 51 which has acquired the program 54 reads a transmission waveform stored in the drive device 57 or the like, generates a deformed transmission waveform in which a transmission waveform is deformed based on an estimated Doppler shift, and stores deformed transmission waveform in the drive device 57 or the like, and thereby the transmission waveform deformation means 105 may achieve a function. Moreover, the CPU 51 which has acquired the program 54 reads the deformed transmission waveform stored in the drive device 57 or the like, performs correlation processing with a reception waveform of a digital signal obtained by receiving, performs presence determination and position calculation for a target, and outputs a result to the input/output interface 60, and thereby the target sensing means 106 may achieve a function.

The program 54 which achieves the function of each component according to each example embodiment is previously saved in, for example, the storage device 55, the ROM 52, or the RAM 53, and may be configured to be read by the CPU 51 according to need.

Note that the program 54 may be supplied to the CPU 51 via the communication network 59, or the program 54 is previously saved in the recording medium 56, and the drive device 57 may read the program and then supply the program to the CPU 51.

Furthermore, there are various modification examples of a method of achieving each example embodiment. Each component according to each example embodiment may be achieved by a given combination of an individual information processing device for each component and a program. Alternatively, a plurality of components provided in respective devices may be achieved by a given combination of one information processing device and a program.

Moreover, a part or the whole of each component according to each example embodiment may be achieved by any other general-purpose or dedicated circuitry, a processor or the like, or a combination thereof. These may be configured by a single chip, or may be configured by a plurality of chips connected via a bus. A part or the whole of each component of each device may be achieved by a combination of the above-described circuitry or the like and a program.

When a part or the whole of each component according to each example embodiment is achieved by a plurality of information processing devices, circuitry, or the like, the plurality of information processing devices, the circuitry, or the like may be centrally arranged or separately arranged. For example, an information processing device, circuitry, or the like may be achieved as a form such as a client and server system or a cloud computing system, in which each information processing device, circuitry, or the like is connected via a communication network.

Figure 2:
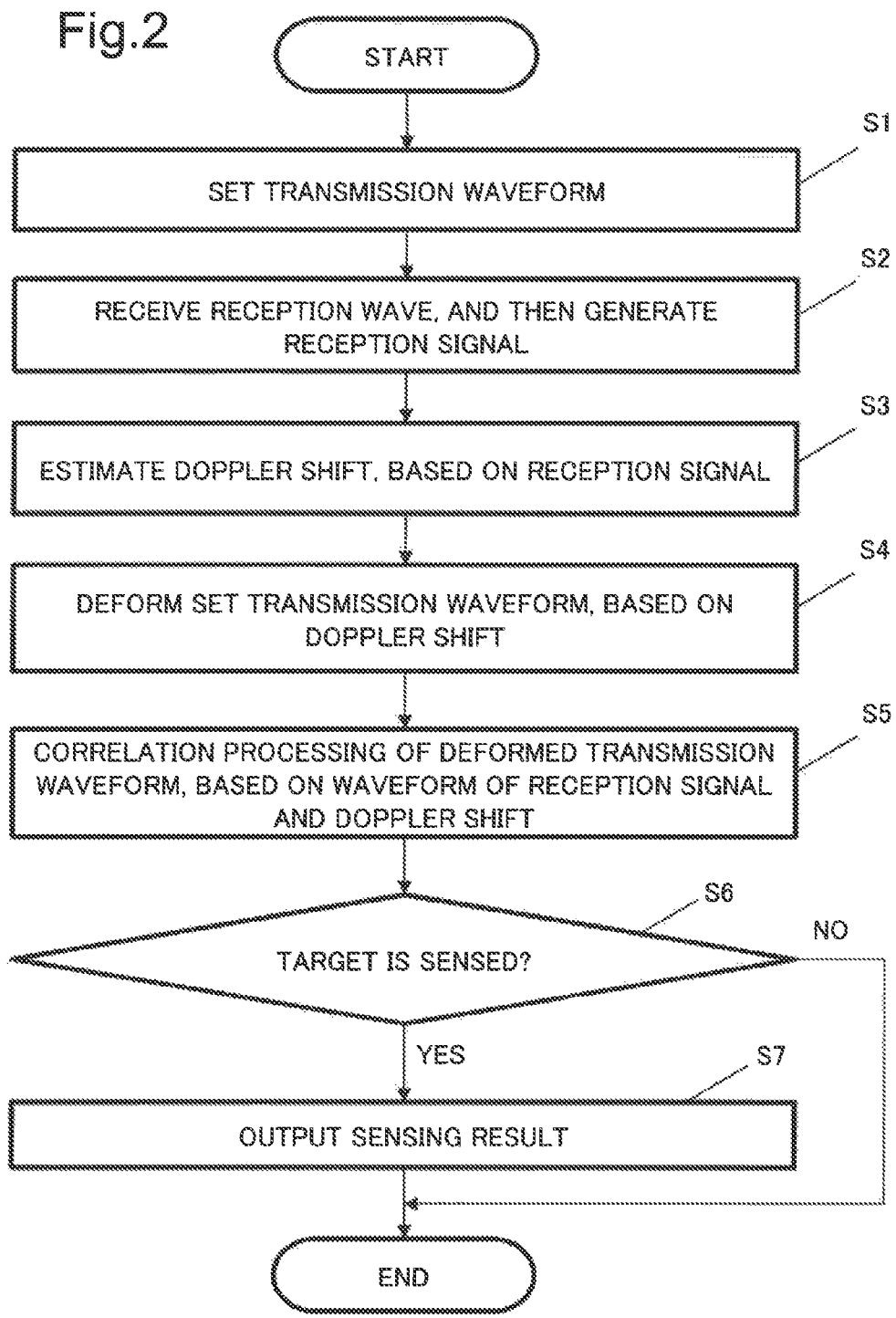
FIG. 2 is a flowchart illustrating an operation according to the first example embodiment of the present invention.

Next, an operation according to the present example embodiment is described. FIG. 2 is a flowchart illustrating an operation according to the present example embodiment.

First, the transmission waveform setting means 101 stores, for example, a transmission waveform set based on a setting operation of a transmission waveform by a user (step S1).

Next, the transmission means 102 converts the transmission waveform stored in the transmission waveform setting means 101 into an analog electric signal, and transmits a transmission wave, based on the analog electric signal. For example, in the case of a sonar, the transmission means 102 transmits a sound wave into the sea, based on the analog electric signal. In the case of a radar, the transmission means 102 transmits an electromagnetic wave into the air, based on the analog electric signal.

Next, the reception means 103 receives an entering wave, emitted by the transmission means 102 including reflection from a target. Moreover, the reception means 103 converts the received wave into a digital electric signal, and then outputs a reception signal. For example, in the case of a sonar, the reception means 103 receives an entering sound wave, converts the sound wave into a digital electric signal, and then outputs a reception signal. For example, in the case of a radar, the reception means 103 converts an entering electromagnetic wave into a digital electric signal, and then outputs a reception signal (step S2).

Then, the Doppler shift estimation means 104 estimates a Doppler shift, based on a reception signal (step S3).

Next, for a transmission waveform stored in the transmission waveform setting means 101, the transmission waveform deformation means 105 generates and stores a deformed transmission waveform deformed based on a Doppler shift estimated by the Doppler shift estimation means 104 (step S4).

Then, for a waveform (reception waveform) of a reception signal, the target sensing means 106 performs correlation processing with the deformed transmission waveform stored in the transmission waveform deformation means 105 (step S5). For example, when a correlation value obtained as a result of performing the correlation processing is more than a previously stored threshold value, the target sensing means 106 determines that a target is present (YES in a step S6), calculates a position of the target, and displays the position of the target on the display of the moving-target detection system 1. The target sensing means 106 may display a position of a target with a polar coordinate around the reception means, or may display a position of a target with a coordinate in which a horizontal axis indicates an azimuth, and a vertical axis indicates a distance (step S7).

As described above, the moving-target detection system 1 according to the present example embodiment sets a transmission waveform, estimates a Doppler shift based on a reception signal, deforms the transmission waveform based on the estimated Doppler shift, performs correlation processing between a reception signal and the deformed transmission waveform, and then determines presence or absence of a target.

Figure 17:
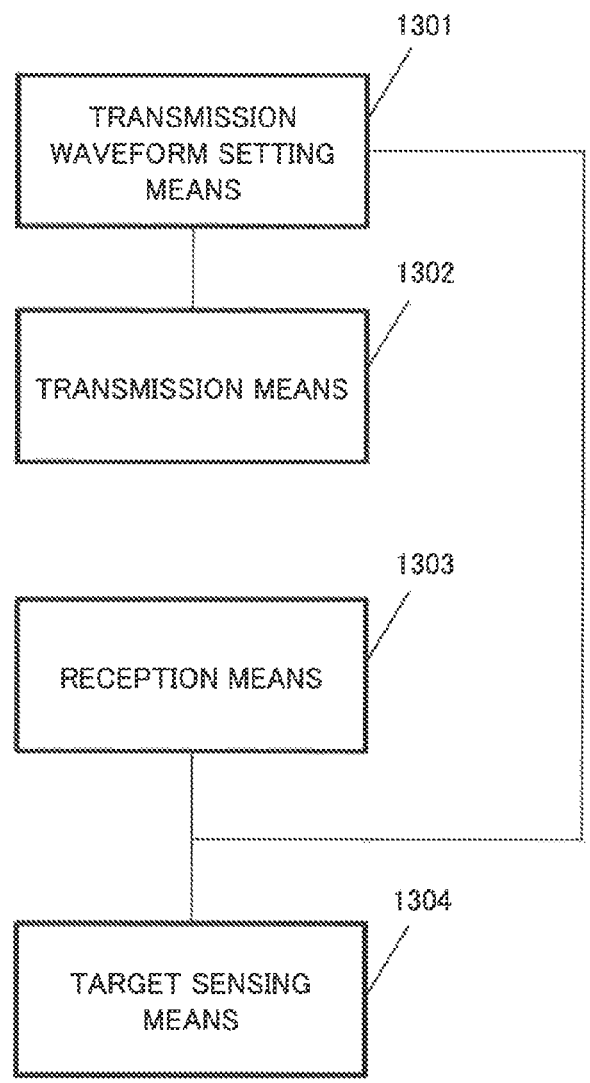
FIG. 17 is a block diagram illustrating a configuration of a related technique.

As a configuration of a related moving-target detection system, there is a configuration, for example, as illustrated in FIG. 17. In the configuration of the moving-target detection system illustrated in FIG. 17, a transmission waveform setting means 1301 sets a transmission waveform, a transmission means 1302 transmits a wave having the set transmission waveform, and a reception means 1303 receives an entering wave, including reflection from a target. Then, a target detection means 1304 performs correlation processing between a reception waveform and the transmission waveform, and determines presence or absence of a target. The moving-target detection system illustrated in FIG. 17 does not estimate a Doppler shift, and does not perform deformation of a transmission waveform based on an estimated Doppler shift. In the configuration illustrated in FIG. 17, when a target is moving, and an S/N ratio of a signal reflected from the target is low, a correlation value decreases in correlation processing for target sensing, and cannot be sensed in some cases.

The moving-target detection system 1 according to the present example embodiment illustrated in FIG. 1 estimates a Doppler shift as described above, performs correlation processing by deforming a transmission waveform, based on an estimated Doppler shift, and determines sensing of a target. By this configuration, even when a target is moving, and an S/N ratio of a signal reflected from the target is low, it is possible to obtain a high correlation value in correlation processing for target sensing, and improve performance of detecting a moving target.

Furthermore, with the technique disclosed in NPL1, there is inconvenience that a waveform cannot be freely selected. However, by the moving-target detection system 1 according to the present example embodiment and other example embodiments described later, it is possible to obtain a high correlation value in correlation processing for target sensing, and improve performance of detecting a moving target, even when any transmission waveform is used.

Moreover, the moving-target detection system 1 according to the present example embodiment does not need prior preparation of a large number of replicas assuming a Doppler shift, enables a high correlation value to be obtained with a small calculation load in correlation processing for target sensing, and improve performance of detecting a moving target.

Second Example Embodiment

Figure 3:
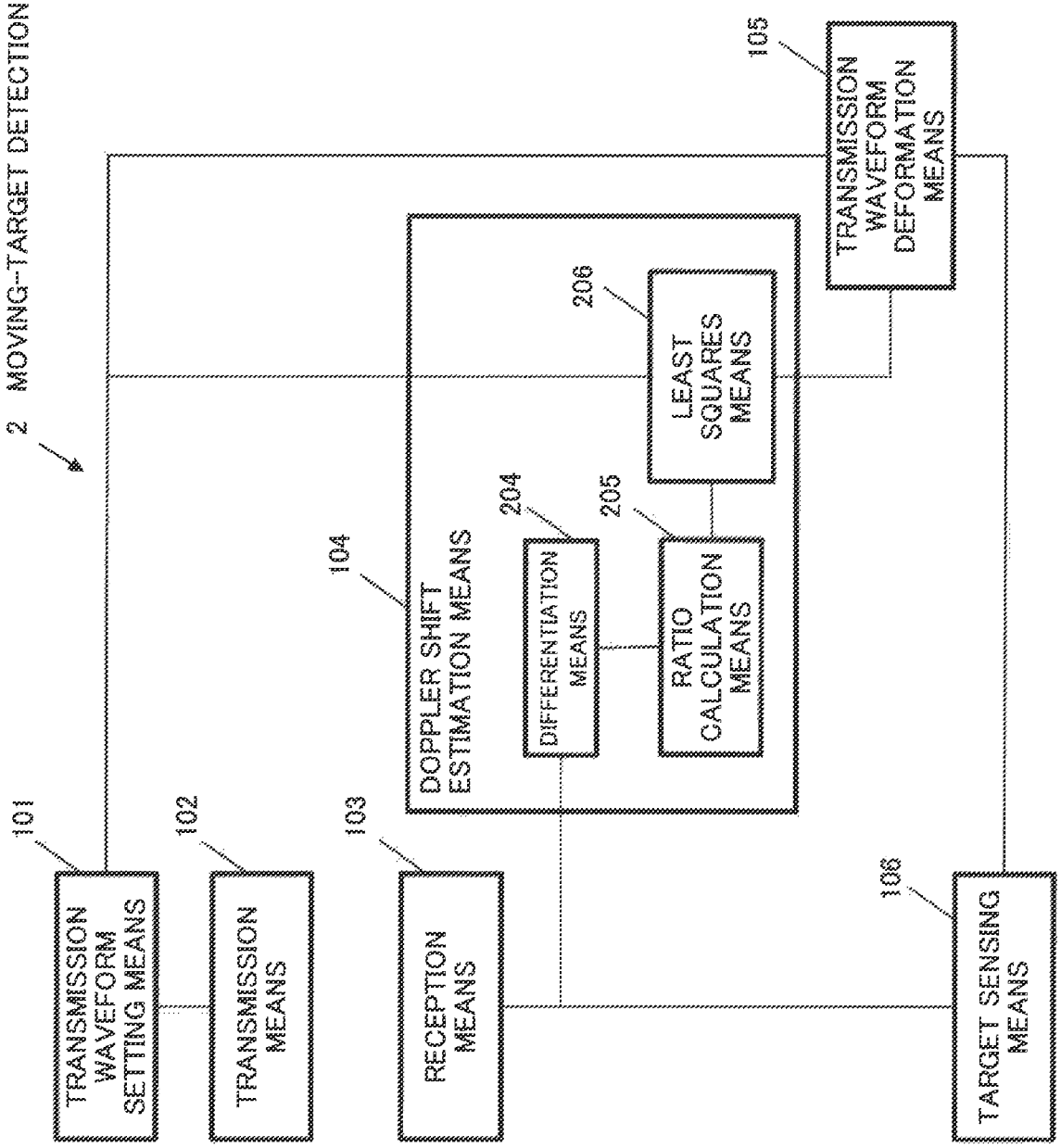
FIG. 3 is a block diagram illustrating a configuration according to a second example embodiment of the present invention.

Next, a second example embodiment of the present invention is described. FIG. 3 is a block diagram illustrating a configuration according to the second example embodiment of the present invention. As illustrated in FIG. 3, in a moving-target detection system 2 according to the present example embodiment, the Doppler shift estimation means 104 includes a differentiation means 204 for time-differentiating a reception signal, and a ratio calculation means 205 for obtaining an absolute value of a ratio of a time-differentiated signal to a received signal. The Doppler shift estimation means 104 also includes a least squares means 206 for estimating a Doppler shift by fitting or the like to an absolute value of a ratio of a time-differentiated signal to a received signal using a least squares method or the like.

Note that, in the present example embodiment, the transmission waveform setting means 101 assumes that a waveform is set in such a way that a transmission waveform St(t) of a transmission signal is represented as follows.

$$St(t) = B \cdot \exp\{j \cdot f(t)\} \quad (1)$$

Herein, f'(t) resulting from differentiation of f(t) is a momentary frequency at a time t, and called an instantaneous frequency. In other words, f(t) is a primitive function of the instantaneous frequency f'(t).

The differentiation means 204 time-differentiates a reception waveform Sr(t) of a reception signal output from the reception means 103, and then outputs a time differentiation Sr'(t). The differentiation means 204 is a digital signal, and therefore, substantially takes a time difference and then outputs as a time differentiation Sr'(t). As a method of taking a time difference, a Savitzky-Golay method (Savitzky-Golay filter) may be used, for example.

The ratio calculation means 205 obtains R(t) being an absolute value of a ratio of the reception waveform Sr(t) to the time differentiation Sr'(t) thereof by Equation (2) below.

$$R(t) = |Sr'(t)/Sr(t)| \quad (2)$$

The transmission waveform St(t) is assumed to be represented as in Equation (1), a signal emitted at a time $t=t_0$ is returned from a target, the target is moving, and a coefficient of a Doppler shift is η. In this case, according to NPL1, the reception waveform Sr(t) from a target is represented as in Equation (3) below.

$$Sr(t) = A\sqrt{\eta} \cdot \exp\{j \cdot f(\eta \cdot (t-t_0))\} \quad (3)$$

Thus, if $\theta_0 = \eta \cdot (t-t_0)$, Equation (4) below is established.

$$\frac{dSr(t)}{dt} = Sr'(t) = A\sqrt{\eta} \cdot \exp\{j \cdot f(\eta \cdot (t-t_0))\} \cdot \eta \cdot \frac{df(\theta_0)}{d\theta_0} \quad (4)$$

R(t) being an absolute value of a ratio of the reception waveform Sr(t) to the time differentiation Sr'(t) thereof is as in Equation (5) below.

$$R(t) = |Sr'(t)/Sr(t)| = \left|\eta \cdot \frac{df(\theta_0)}{d\theta_0}\right| \quad (5)$$

In the case of a radar, a sonar, and a lidar as well, it is always $c > |v_o|$, $c > |v_s|$, and therefore, $\eta > 0$ is established. Moreover, since an instantaneous frequency $df(\theta_0)/d\theta_0$ is generally set in such a way as to be constantly zero or more in many cases, Equation (6) below is established.

$$R(t) = \eta \cdot \frac{df(\theta_0)}{d\theta_0} \quad (6)$$

The instantaneous frequency $df(\theta_0)/d\theta_0$ is known in advance. Moreover, R(t) is obtained from the reception waveform Sr(t) obtained by measurement. From this, the least squares means 206 can obtain $t_0$ and η being unknown quantities, by fitting or the like of the instantaneous frequency $df(\theta_0)/d\theta_0$ of the transmission waveform St(t) to R(t) being an absolute value of a ratio of the reception waveform Sr(t) to the time differentiation Sr'(t) thereof, using a least squares method or the like.

Figure 4:
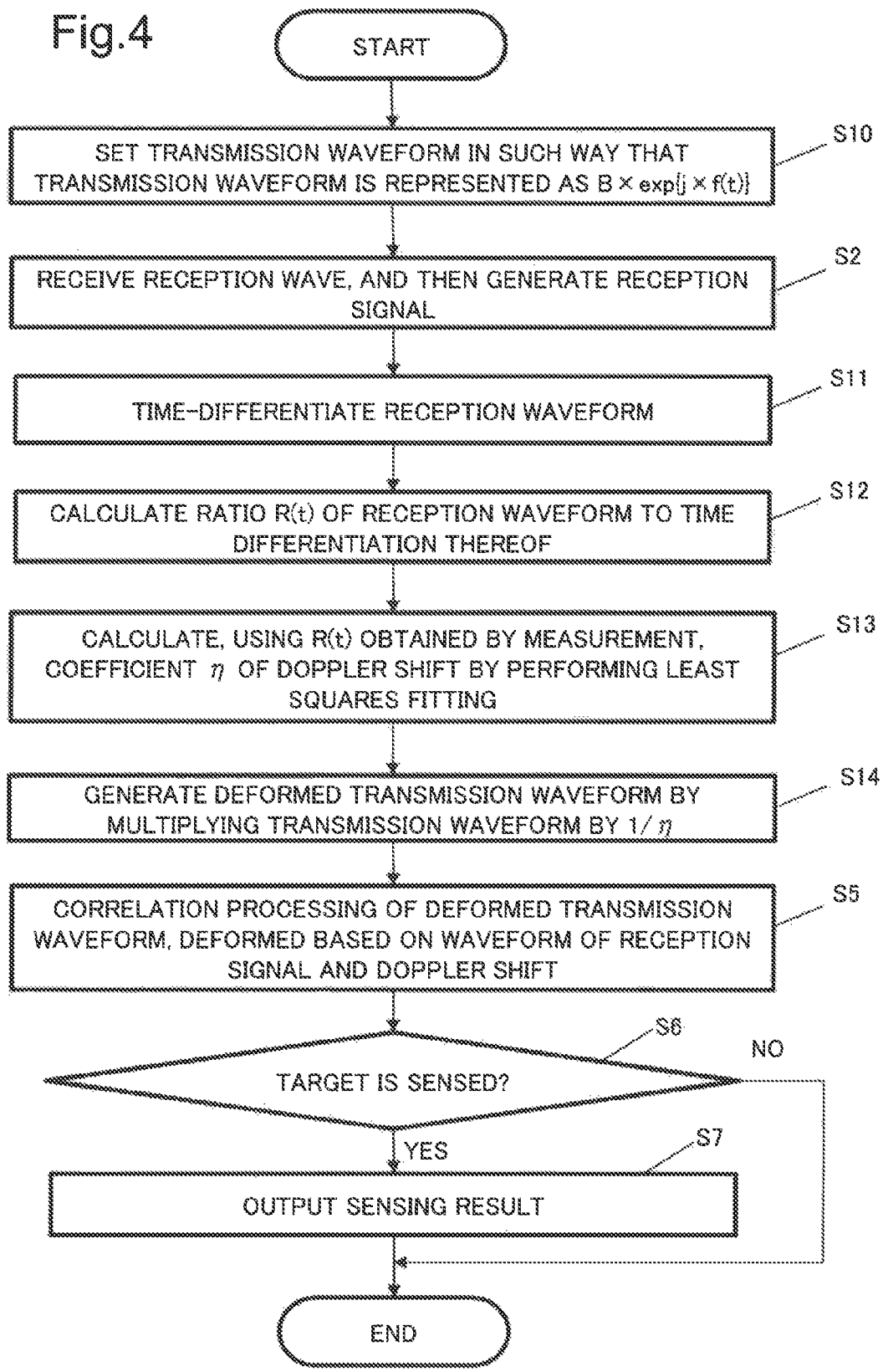
FIG. 4 is a flowchart illustrating an operation according to the second example embodiment of the present invention.

An operation according to the present example embodiment is described. FIG. 4 is a flowchart illustrating an operation according to the second example embodiment of the present invention.

First, in such a way as to correspond to the processing in the step S1 in the first example embodiment, the transmission waveform setting means 101 sets a transmission waveform St(t) as in Equation (1), based on a setting operation of a transmission waveform by a user, and stores the transmission waveform St(t) (step S10). The transmission means 102 transmits a transmission wave having the transmission waveform St(t).

Next, a wave emitted by the transmission means 102 including reflection from a target enters the reception means 103. The reception means 103 converts, into a digital electric signal, an analog electric signal based on the entering wave, and then outputs a reception signal (step S2).

Then, in such a way as to correspond to the processing in the step S3 in the first example embodiment, the following processing is performed. The Doppler shift estimation means 104 estimates a Doppler shift, based on the reception waveform Sr(t). Specifically, first, the differentiation means 204 time-differentiates the reception waveform Sr(t), and then outputs the time differentiation Sr'(t) of the reception waveform (step S11). Then, the ratio calculation means 205 calculates R(t) being an absolute value of a ratio of the reception waveform Sr(t) to the time differentiation Sr'(t) thereof (step S12). Then, in accordance with Equation (6), the least squares means 206 calculates, using R(t) obtained by measurement, a coefficient η of a Doppler shift by performing least squares fitting with a function in which the instantaneous frequency df(θ₀)/dθ₀ is multiplied by η (step S13).

Then, in such a way as to correspond to the processing in the step S4 in the first example embodiment, for the transmission waveform St(t) stored in the transmission waveform setting means 101, the transmission waveform deformation means 105 generates a deformed transmission waveform deformed by a Doppler shift, based on a Doppler shift estimated by the Doppler shift estimation means 104, and stores the deformed transmission waveform (step S14). In other words, the transmission waveform deformation means 105 generates and stores a deformed transmission waveform 1/η×St(t) in which the transmission waveform St(t) is multiplied by 1/η.

Then, as in the first example embodiment, the target sensing means 106 performs correlation processing of between the reception waveform Sr(t) and the deformed transmission waveform 1/η×St(t) (step S5), and determines whether a target is sensed (step S6). For example, when a value after the correlation processing is more than a previously stored threshold value, the target sensing means 106 determines that a target is present. When it is determined in the step S6 that a target is sensed, a sensing result is displayed, as in the first example embodiment (step S7). The target sensing means 106 calculates, for example, a position of the target, and displays the position of the target on, for example, a display. The target sensing means 106 may display a position of a target with a polar coordinate around the reception means, or may display a position of a target with a coordinate in which a horizontal axis indicates an azimuth, and a vertical axis indicates a distance.

As described above, the moving-target detection system 2 according to the present example embodiment sets a transmission waveform St(t) as in Equation (1), obtains a time differentiation Sr'(t) by time-differentiating the reception waveform Sr(t), and obtains an absolute value R(t) of a ratio of the time differentiation Sr'(t) to the reception waveform Sr(t). Further, in accordance with Equation (6), the moving-target detection system 2 calculates, using the absolute value R(t) of a ratio of the reception waveform Sr(t) obtained by measurement to the time differentiation Sr'(t) thereof, a coefficient η of a Doppler shift by performing least squares fitting with a function in which the instantaneous frequency df(θ₀)/dθ₀ is multiplied by η. Then, the moving-target detection system 2 generates a deformed transmission waveform 1/η×St(t), based on the estimated Doppler shift coefficient η, performs correlation processing with the reception waveform Sr(t), and then determines target sensing. By this configuration, as in the first example embodiment, a high correlation value can be obtained in correlation processing for target sensing, there is a degree of freedom in a transmission waveform, and performance of detecting a moving target can be improved even with a single sensor.

Third Example Embodiment

Figure 5:
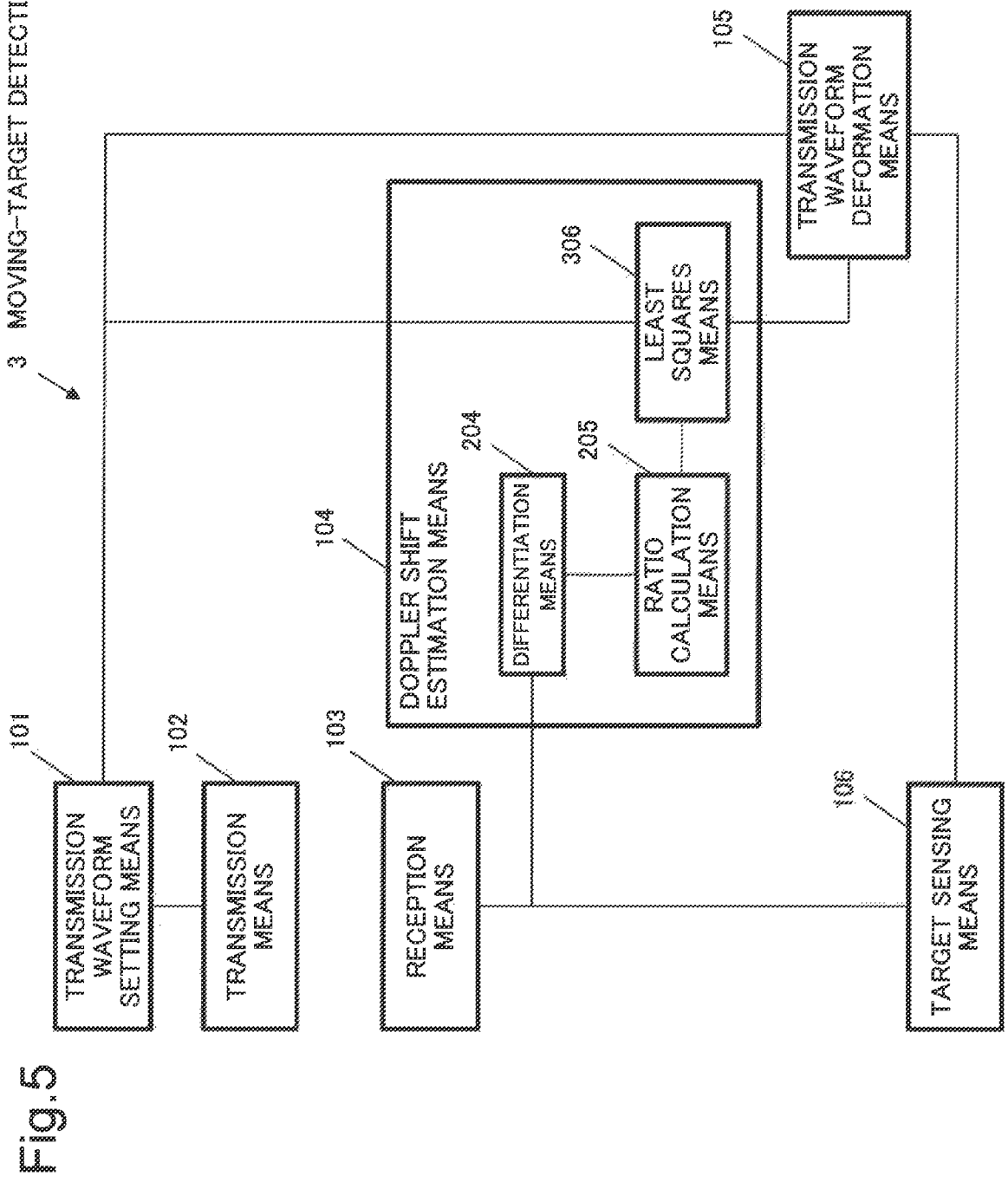
FIG. 5 is a block diagram illustrating a configuration according to a third example embodiment of the present invention.

Next, a third example embodiment of the present invention is described. FIG. 5 is a block diagram illustrating a configuration according to the third example embodiment of the present invention. In the moving-target detection system 2 according to the present example embodiment, the Doppler shift estimation means 104 includes, instead of the least squares means 206 according to the second example embodiment, a least squares means 306 for obtaining each coefficient when representing by a polynomial expression of time in least squares fitting, and then obtaining a Doppler shift coefficient η from the highest-order coefficient.

Note that, similarly to the second example embodiment, the present example embodiment is also an example embodiment assuming that the transmission waveform setting means 101 sets a transmission waveform St(t) of a transmission signal as in Equation (1), and the instantaneous frequency f'(t) can be represented by an N-th order polynomial expression in terms of time, i.e., as in Equation (7) below.

$$f'(t) = \sum_{n=0}^{N} a_n t^n \tag{7}$$

Therefore, a function in which the instantaneous frequency df(θ₀)/dθ₀ is multiplied by η, assuming that θ₀=η·(t-t₀), can be represented by an N-th order polynomial expression in terms of time.

Furthermore, as in the second example embodiment, using a relational equation of Equation (6), the least squares means 306 fits, by a least squares method, a function in which the instantaneous frequency df(θ₀)/dθ₀ obtained from a waveform known in advance is multiplied by η, to R(t) obtained from a reception signal.

In the present example embodiment, it is assumed that, for example, a function in which the instantaneous frequency df(θ₀)/dθ₀ is multiplied by η is represented by a polynomial expression of time, as in Equation (8) below.

$$\eta \cdot \frac{df(\theta_0)}{d\theta_0} = \eta \cdot \sum_{n=0}^{N} a_n \theta_0^n = \tag{8}$$

$$\sum_{n=0}^{N} a_n \eta^{n+1} (t-t_0)^n = \sum_{n=0}^{N} a_n \eta^{n+1} \sum_{k=0}^{n} \binom{n}{k} t^k (-1)^{n-k} t_0^{n-k} =$$

$$\sum_{n=0}^{N} \sum_{k=0}^{n} a_n \eta^{n+1} \binom{n}{k} (-1)^{n-k} t_0^{n-k} t^k =$$

$$\sum_{k=0}^{0} a_0 \eta^1 \binom{0}{k} (-1)^{-k} t_0^{-k} t^k + \sum_{k=0}^{1} a_1 \eta^2 \binom{1}{k} (-1)^{1-k} t_0^{1-k} t^k +$$

$$\ldots = \left\{ \sum_{n=0}^{N} a_n \eta^{n+1} \binom{n}{0} (-1)^n t_0^n \right\} t^0 +$$

$$\left\{ \sum_{n=1}^{N} a_n \eta^{n+1} \binom{n}{1} (-1)^{n-1} t_0^{n-1} \right\} t^1 + \ldots =$$

$$\sum_{k=0}^{N} \left\{ \sum_{n=k}^{N} a_n \eta^{n+1} \binom{n}{k} (-1)^{n-k} t_0^{n-k} \right\} t^k = \sum_{k=0}^{N} C_k t^k$$

In a moving-target detection system 3 according to the present example embodiment, a k-th order coefficient $C_k$ when a function in which the instantaneous frequency df(θ₀)/dθ₀ is multiplied by θ is represented by a polynomial expression of time, in least squares fitting, is obtained as in Equation (9) below.

$$C_k = \left\{ \sum_{n=k}^{N} a_n \eta^{n+1} \binom{n}{k} (-1)^{n-k} t_0^{n-k} \right\} \quad (9)$$

$C_k$ is a polynomial equation regarding η, and it is generally difficult to solve this polynomial equation with regard to η. However, a highest-order coefficient regarding t is as in Equation (10) below.

$$C_N = \left\{ \sum_{n=N}^{N} a_n \eta^{n+1} \binom{n}{k} (-1)^{n-k} t_0^{n-k} \right\} = a_N \eta^{N+1} \quad (10)$$

Therefore, Equation (11) below is established.

$$\eta = \sqrt[N+1]{C_N / a_N} \quad (11)$$

From this Equation (11), η can be easily obtained.

An operation according to the present example embodiment is described. First, as in the first and second example embodiments, the transmission waveform setting means 101 sets, for example, based on a setting operation of a transmission waveform by a user, a transmission waveform St(t) as in Equation (1), and stores the transmission waveform St(t). The transmission means 102 transmits a transmission wave having the transmission waveform St(t).

Next, a wave emitted by the transmission means 102 including reflection from a target enters the reception means 103. The reception means 103 converts, into a digital electric signal, an analog electric signal based on the entering wave, and then outputs a reception signal.

Then, the Doppler shift estimation means 104 estimates a Doppler shift, based on the reception waveform Sr(t). In the present example embodiment as well as in the second example embodiment, the differentiation means 204 time-differentiates the reception waveform Sr(t), and then outputs the time differentiation Sr'(t) of the reception waveform. And the ratio calculation means 205 calculates R(t) being an absolute value of a ratio of the reception waveform Sr(t) to the time differentiation Sr'(t) thereof.

Then, the least squares means 306 fits, by a least squares method, a function in which an instantaneous frequency is multiplied by η, to R(t) obtained from a reception signal. The least squares means 306 obtains a highest-order coefficient $C_N$, and obtains η from Equation (11).

As in the second example embodiment, the transmission waveform deformation means 105 generates and stores a deformed transmission waveform 1/η×St(t) in which the transmission waveform St(t) is multiplied by 1/η. Then, the target sensing means 106 performs correlation processing between the reception waveform Sr(t) and the deformed transmission waveform 1/η×St(t), and determines whether a target is sensed. For example, when a value after the correlation processing is more than a previously stored threshold value, the target sensing means 106 determines that a target is present, and displays a sensing result.

According to the present example embodiment, an advantageous effect similar to that in the first and second example embodiments can be obtained, when a transmission waveform St(t) of a transmission signal is set as in Equation (1), and the instantaneous frequency f'(t) can be represented by an N-th order polynomial expression in terms of time, i.e., as in Equation (7).

Fourth Example Embodiment

Figure 6:
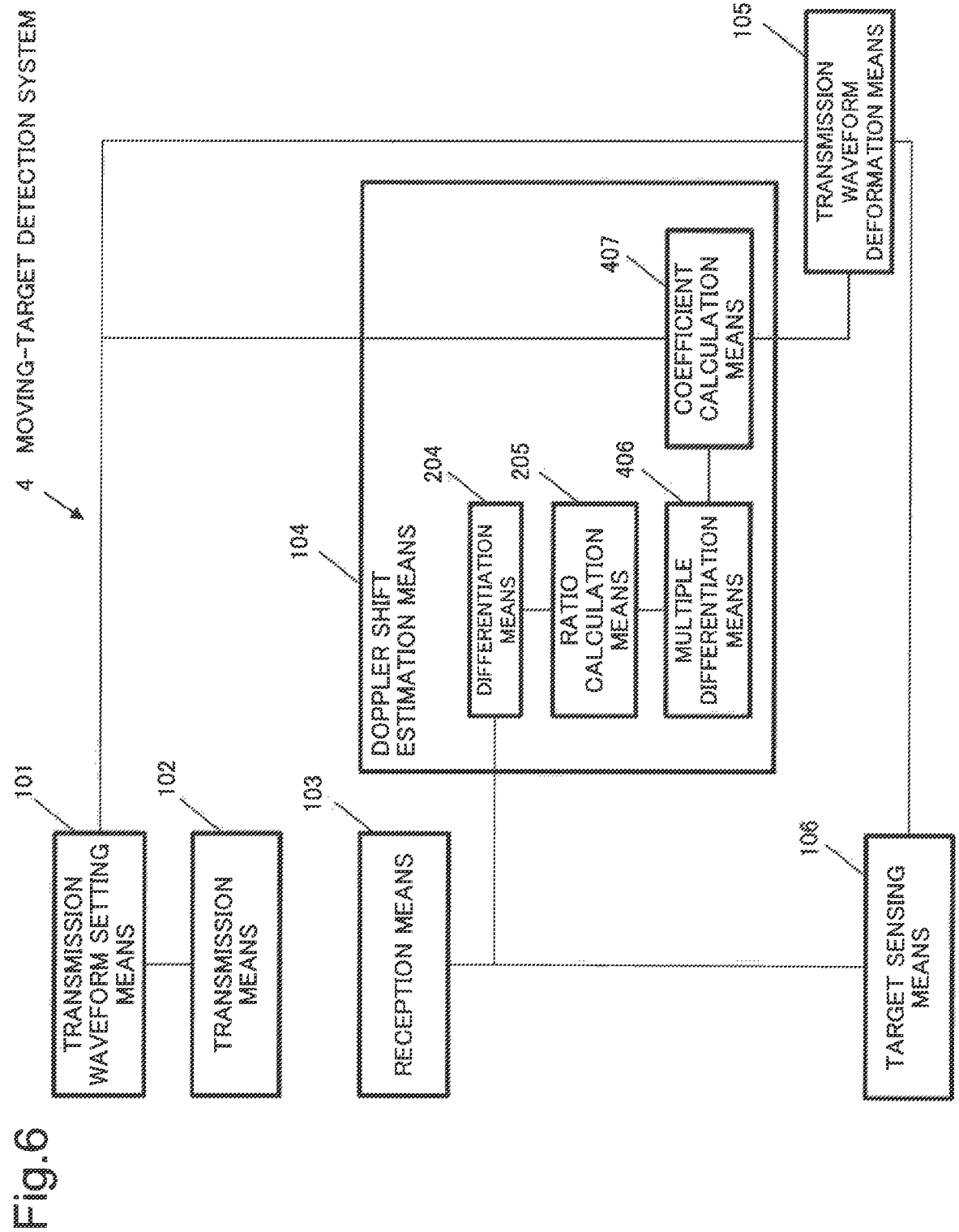
FIG. 6 is a block diagram illustrating a configuration according to a fourth example embodiment of the present invention.

Next, a fourth example embodiment of the present invention is described. FIG. 6 is a block diagram illustrating a configuration according to the fourth example embodiment of the present invention. As illustrated in FIG. 6, in a moving-target detection system 4 according to the present example embodiment, the Doppler shift estimation means 104 includes, instead of the least squares means 306 according to the third example embodiment, a multiple differentiation means 406 for time-differentiating an absolute value R(t) of a ratio of a time differentiation Sr'(t) of a reception waveform to a reception waveform Sr(t), a plurality of times. The Doppler shift estimation means 104 also includes a coefficient calculation means 407 for estimating a Doppler shift from a result of time-differentiating a plurality of times and the transmission waveform St(t) known in advance.

Note that, as in the second and third example embodiments, the present example embodiment is also an example embodiment assuming that the transmission waveform St(t) is set as in Equation (1), and the instantaneous frequency f'(t) can be represented by an N-th order polynomial expression in terms of time.

The multiple differentiation means 406 obtains $R^{(N)}(t)$ by differentiating R(t) N times.

$$R^{(N)}(t) = \frac{d^N}{dt^N} R(t) \quad (12)$$

The coefficient calculation means 407 divides R(t) differentiated N times by $N! \times |a_N|$ known in advance, calculates an N+1-th root thereof, and thereby obtains a coefficient η of a Doppler shift, by Equation (13) below.

$$\eta = \sqrt[N+1]{\frac{d^N}{dt^N} R(t) / N! |a_N|} \quad (13)$$

Equation (13) is derived as follows. It is assumed that a signal from a target is Doppler-shifted by the coefficient η. In other words, a signal from a target can be represented as in Equation (3). If a transmission signal is as described above, the instantaneous frequency $df(\theta_0)/d\theta_0$ can be represented by an N-th order polynomial expression in terms of time, as in Equation (14), assuming that $\theta_0 = \eta \cdot (t - t_0)$.

$$\frac{df(\theta_0)}{d\theta_0} = \sum_{n=0}^{N} a_n \theta_0^n \quad (14)$$

In this case, by time-differentiating this N times, Equations (15) and (16) can be obtained.

$$\frac{d^N}{dt^N} \left\{ \frac{df(\theta_0)}{d\theta_0} \right\} = N! a_N \eta^N \quad (15)$$

-continued $$\frac{d^N}{dt^N}R(t) = \frac{d^N}{dt^N}\left\{\eta \cdot \frac{df(\theta_0)}{d\theta_0}\right\} = N!a_N\eta^{N+1} \quad (16)$$

By dividing this by $N!a_N$ known in advance, Equation (17) can be obtained.

$$\frac{d^N}{dt^N}R(t)/N!a_N = \eta^{N+1} \quad (17)$$

When a case where the instantaneous frequency $df(\theta_0)/d\theta_0$ becomes negative is considered, Equations (18), (19), and (20) are established.

$$R(t) = \eta\left|\frac{df(\theta_0)}{d\theta_0}\right| \quad (18)$$

$$\frac{d^N}{dt^N}R(t) = \frac{d^N}{dt^N}\left\{\eta \cdot \left|\frac{df(\theta_0)}{d\theta_0}\right|\right\} = N!|a_N|\eta^{N+1} \quad (19)$$

$$\frac{d^N}{dt^N}R(t)/N!|a_N| = \eta^{N+1} \quad (20)$$

By an N+1-th root thereof, a coefficient η of a Doppler shift is obtained. In this way, Equation (13) above is derived.

An operation according to the present example embodiment is described. First, as in the other example embodiments described above, the transmission waveform setting means 101 sets, for example, based on a setting operation of a transmission waveform by a user, a transmission waveform St(t) as in Equation (1), and stores the transmission waveform St(t). The transmission means 102 transmits a transmission wave having the transmission waveform St(t).

Next, a wave emitted by the transmission means 102 including reflection from a target enters the reception means 103. The reception means 103 converts, into a digital electric signal, an analog electric signal based on the entering wave, and then outputs a reception signal.

Then, the Doppler shift estimation means 104 estimates a Doppler shift, based on the reception waveform Sr(t). In the present example embodiment as well as in the second example embodiment, the differentiation means 204 time-differentiates the reception waveform Sr(t), and then outputs the time differentiation Sr'(t) of the reception waveform. And the ratio calculation means 205 calculates R(t) being an absolute value of a ratio of the reception waveform Sr(t) to the time differentiation Sr'(t) thereof.

Then, in the present example embodiment, the multiple differentiation means 406 obtains $R^{(N)}(t)$ from Equation (12) by differentiating R(t) N times.

By Equation (13), the coefficient calculation means 407 divides R(t) differentiated N times, by $N!\times|a_N|$ known in advance. Then, the coefficient calculation means 407 calculates an N+1-th root thereof, and thereby obtains a coefficient η of a Doppler shift.

As in the second and third example embodiments, the transmission waveform deformation means 105 generates and stores a deformed transmission waveform $1/\eta \times St(t)$ in which the transmission waveform St(t) is multiplied by $1/\eta$.

Then, the target sensing means 106 performs correlation processing between the reception waveform Sr(t) and the deformed transmission waveform $1/\eta \times St(t)$, and determines whether a target is sensed. For example, when a value after the correlation processing is more than a previously stored threshold value, the target sensing means 106 determines that a target is present, and displays a sensing result.

According to the present example embodiment, an advantageous effect similar to that in the other example embodiments described above can be obtained, when a transmission waveform St(t) of a transmission signal is set as in Equation (1), and the instantaneous frequency f'(t) can be represented by an N-th order polynomial expression in terms of time, i.e., as in Equation (7).

Fifth Example Embodiment

Next, a fifth example embodiment of the present invention is described. The fifth example embodiment is an example embodiment corresponding to a case where a transmission waveform is a pulsed continuous wave (PCW) being constant in frequency, and assuming that the transmission waveform St(t) can be represented as follows.

$$St(t) = \begin{cases} B \cdot \exp(j\omega t) & |t| \le \frac{T_0}{2} \\ 0 & \text{OTHER THAN THE ABOVE} \end{cases}$$

Figure 7:
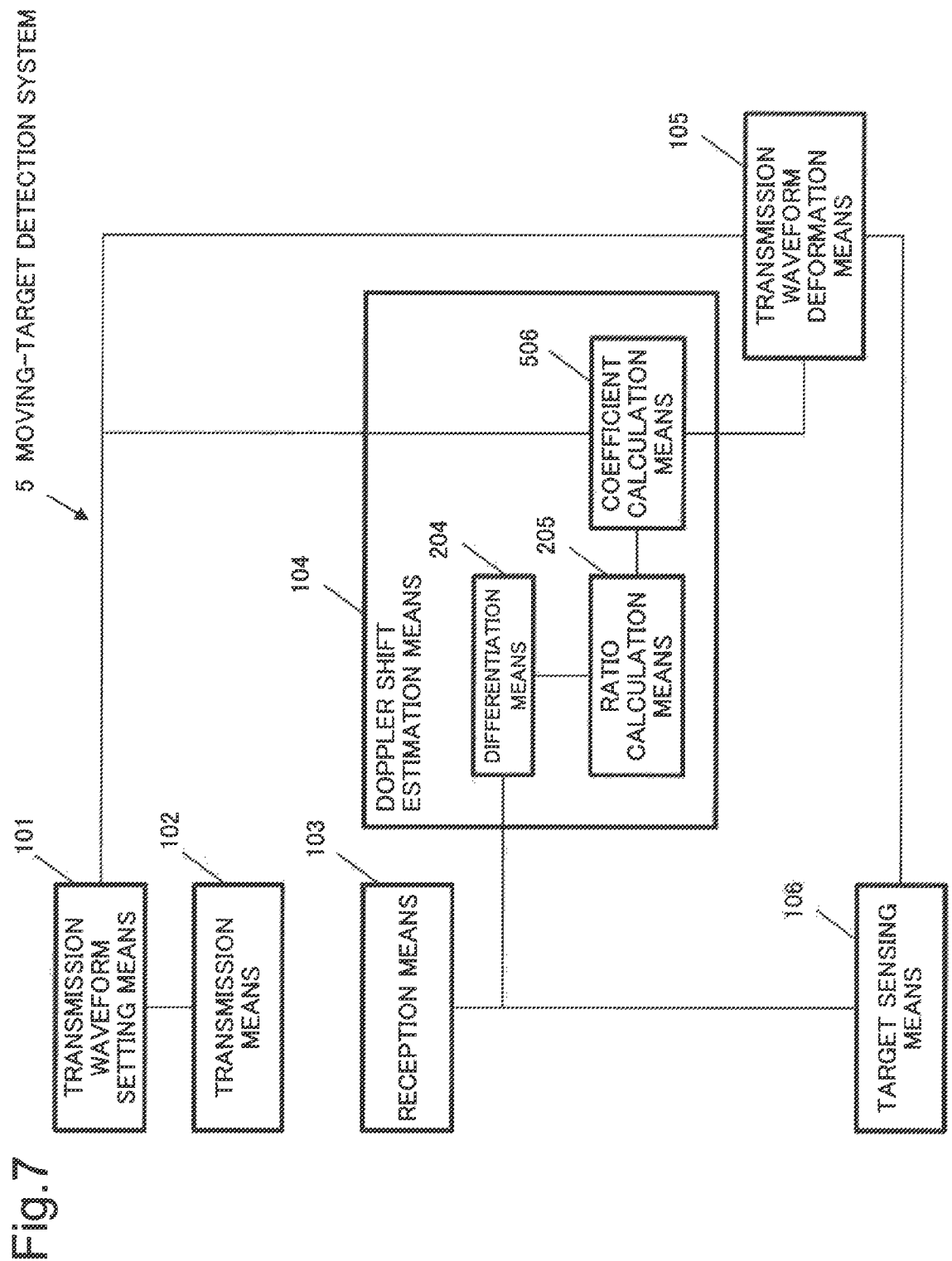
FIG. 7 is a block diagram illustrating a configuration according to a fifth example embodiment of the present invention.

FIG. 7 is a block diagram illustrating a configuration according to the fifth example embodiment of the present invention. As illustrated in FIG. 7, in a moving-target detection system 5 according to the present example embodiment, the Doppler shift estimation means 104 includes a coefficient calculation means 506 for estimating a Doppler shift from the absolute value R(t) of a ratio of the reception waveform Sr'(t) time-differentiated, without passing through the multiple differentiation means 406 according to the fourth example embodiment, to the reception waveform Sr(t), and from the transmission waveform St(t) known in advance.

The coefficient calculation means 506 obtains a coefficient η of a Doppler shift, using a known angular frequency ω, by Equation (21) below.

$$\eta = R(t)/\omega \quad (21)$$

Equation (21) is derived as follows. It can also be said that a PCW is frequency modulation represented by a 0-th order polynomial expression in terms of time. For example, when a PCW in which the transmission waveform St(t) is represented as $$St(t) = \begin{cases} B \cdot \exp(j\omega t) & |t| \le \frac{T_0}{2} \\ 0 & \text{OTHER THAN THE ABOVE} \end{cases}$$

is transmitted, the reception waveform Sr(t) from a target can be represented as follows.

$$Sr(t) = \begin{cases} A\sqrt{\eta}\exp\{j\omega\eta(t-t_0)\} & |\eta(t-t_0)| \le \frac{T_0}{2} \\ 0 & \text{OTHER THAN THE ABOVE} \end{cases}$$

Assuming that $\theta_0 = \eta \cdot (t-t_0)$, a phase $f(\theta_0)$, the instantaneous frequency $df(\theta_0)/d\theta_0$, and the absolute value R(t) of a ratio of the time-differentiated reception waveform Sr'(t) to the reception waveform Sr(t) can be represented as follows.

$$f(\theta_0) = \begin{cases} \omega\theta_0 & |\theta_0| \le \dfrac{T_0}{2} \\ 0 & \text{OTHER THAN THE ABOVE} \end{cases}$$

$$\frac{df(\theta_0)}{d\theta_0} = \begin{cases} \omega & |\theta_0| \le \dfrac{T_0}{2} \\ 0 & \text{OTHER THAN THE ABOVE} \end{cases}$$

$$R(T) = \begin{cases} \eta\omega & |t - t_0| \le \dfrac{T_0}{2} \\ 0 & \text{OTHER THAN THE ABOVE} \end{cases}$$

The angular frequency ω is known in advance, and a coefficient of Doppler can be obtained from Equation (21).

An operation according to the present example embodiment is described. First, the transmission waveform setting means 101 sets, for example, based on a setting operation of a transmission waveform by a user, a transmission waveform St(t) as follows, and stores the transmission waveform St(t).

$$St(t) = \begin{cases} B \cdot \exp(j\omega t) & |t| \le \dfrac{T_0}{2} \\ 0 & \text{OTHER THAN THE ABOVE} \end{cases}$$

The transmission means 102 transmits a transmission wave having the transmission waveform St(t).

Next, a wave emitted by the transmission means 102 including reflection from a target enters the reception means 103. The reception means 103 converts, into a digital electric signal, an analog electric signal based on the entering wave, and then outputs a reception signal.

Then, the Doppler shift estimation means 104 estimates a Doppler shift, based on the reception waveform Sr(t). In the present example embodiment as well, the differentiation means 204 time-differentiates the reception waveform Sr(t), and then outputs the time differentiation Sr'(t) of the reception waveform. And the ratio calculation means 205 calculates R(t) being an absolute value of a ratio of the reception waveform Sr(t) to the time differentiation Sr'(t) thereof.

Then, in the present example embodiment, using the known angular frequency ω, the coefficient calculation means 506 divides R(t) by ω, by Equation (21), and thereby obtains a coefficient η of a Doppler shift.

As in the other example embodiments described above, the transmission waveform deformation means 105 generates and stores a deformed transmission waveform 1/η×St(t) in which the transmission waveform St(t) is multiplied by 1/η.

Then, the target sensing means 106 performs correlation processing between the reception waveform Sr(t) and the deformed transmission waveform 1/η×St(t), and determines whether a target is sensed. For example, when a value after the correlation processing is more than a previously stored threshold value, the target sensing means 106 determines that a target is present, and displays a sensing result.

According to the present example embodiment, an advantageous effect similar to that in the other example embodiments described above can be obtained, when a transmission waveform St(t) of a PCW being constant in frequency is set.

Sixth Example Embodiment

Next, a sixth example embodiment of the present invention is described. The sixth example embodiment is an example embodiment corresponding to a case of linear frequency modulation (LFM) which performs, on a transmission waveform, frequency modulation represented by a first order polynomial expression in terms of time, and assuming that the transmission waveform St(t) is represented as follows.

$$St(t) = \begin{cases} B \cdot \exp\left(j\omega t + \dfrac{j\mu t^2}{2}\right) & |t| \le \dfrac{T_0}{2} \\ 0 & \text{OTHER THAN THE ABOVE} \end{cases}$$

Figure 8:
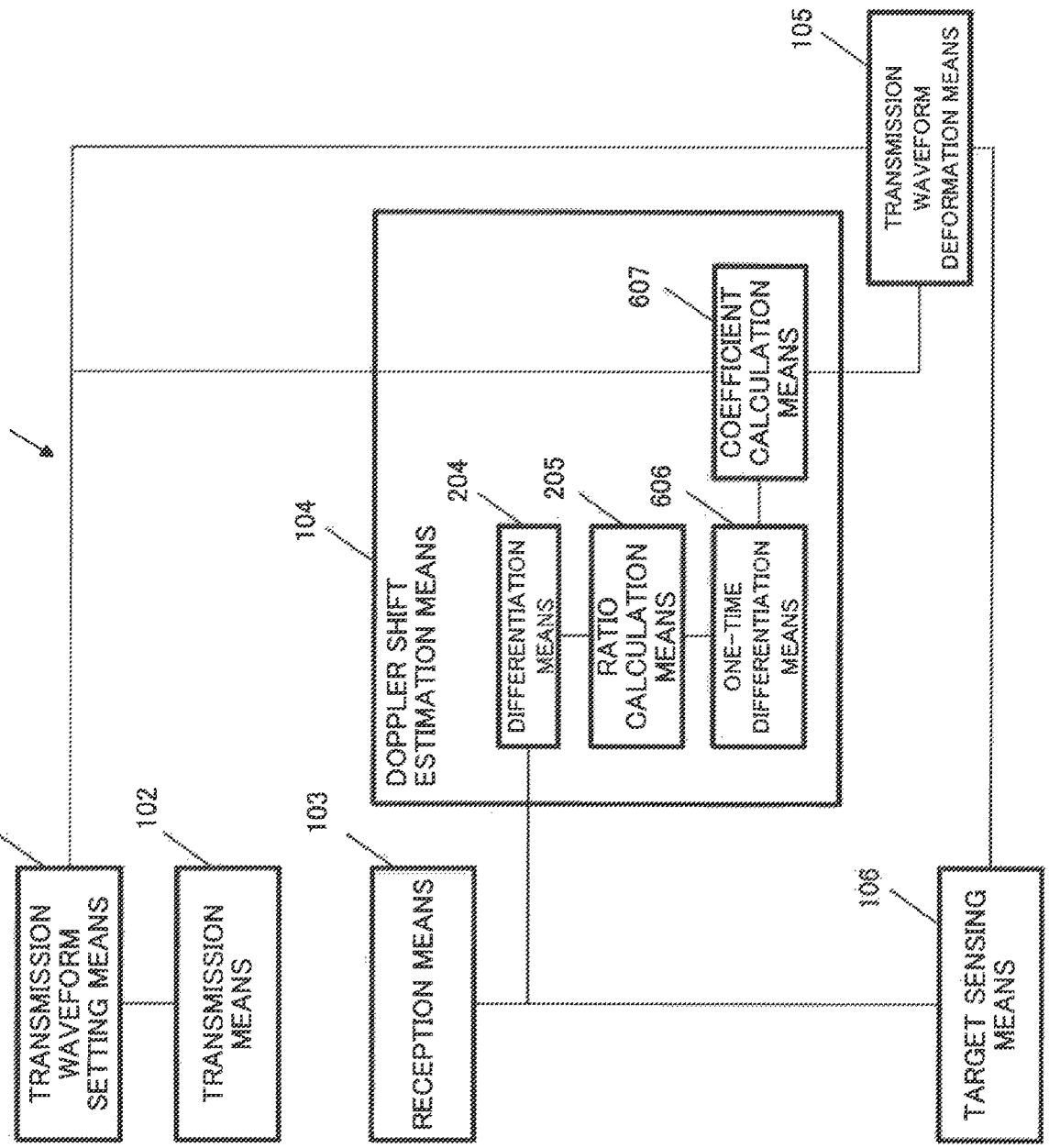
FIG. 8 is a block diagram illustrating a configuration according to a sixth example embodiment of the present invention.

FIG. 8 is a block diagram illustrating a configuration according to the sixth example embodiment of the present invention. As illustrated in FIG. 8, in a moving-target detection system 6 according to the sixth example embodiment, the Doppler shift estimation means 104 includes, instead of the multiple differentiation means 406 according to the fourth example embodiment, a one-time differentiation means 606 for time-differentiating the absolute value R(t) of a ratio of the time-differentiated reception waveform Sr'(t) to the reception waveform Sr(t) only one time, and a coefficient calculation means 607 for estimating a Doppler shift from a result R'(t) of one differentiation.

The one-time differentiation means 606 time-differentiates the absolute value R(t) of a ratio of the time-differentiated reception waveform Sr'(t) to the reception waveform Sr(t) only one time, and obtains R'(t).

The coefficient calculation means 607 obtains a coefficient η of a Doppler shift, using a known angular frequency change rate μ, by Equation (22) below.

$$\eta = \sqrt{|R'(t)|/\mu} \tag{22}$$

If the instantaneous frequency f'(t) does not become negative, the absolute value in Equation (22) can be omitted, and thus, Equation (23) is established.

$$\eta = \sqrt{R'(t)/\mu} \tag{23}$$

Equation (22) is derived as follows. It can also be said that a LFM is frequency modulation represented by a first order polynomial expression in terms of time. For example, in the case of LFM in which a transmission waveform is represented as described above, the phase f(t) can be represented as follows.

$$f(t) = \begin{cases} \omega t + \dfrac{\mu t^2}{2} & |t| \le \dfrac{T_0}{2} \\ 0 & \text{OTHER THAN THE ABOVE} \end{cases}$$

The reception waveform Sr(t) from a target can be represented as follows.

$$Sr(t) = \begin{cases} A\sqrt{\eta} \exp\left\{ j\omega \cdot \eta(t - t_0) + \dfrac{j\mu \cdot \eta^2(t - t_0)^2}{2} \right\} & |\eta(t - t_0)| \le \dfrac{T_0}{2} \\ 0 & \text{OTHER THAN THE ABOVE} \end{cases}$$

Assuming that $\theta_0 = \eta \cdot (t - t_0)$, the phase $f(\theta_0)$ can be represented as follows.

$$f(\theta_0) = \begin{cases} \omega\theta_0 + \dfrac{\mu\theta_0^2}{2} & |\theta_0| \le \dfrac{T_0}{2} \\ 0 & \text{OTHER THAN THE ABOVE} \end{cases}$$

The instantaneous frequency $df(\theta_0)/d\theta_0$ can be represented as follows.

$$\dfrac{df(\theta_0)}{d\theta_0} = \begin{cases} \omega + \mu\theta_0 & |\theta_0| \le \dfrac{T_0}{2} \\ 0 & \text{OTHER THAN THE ABOVE} \end{cases}$$

Thus, the absolute value $R(t)$ of a ratio of the time-differentiated reception waveform $Sr'(t)$ to the reception waveform $Sr(t)$ can be represented as follows.

$$R(t) = \begin{cases} \eta\{\omega + \mu\theta_0\} = \eta\{\omega + \mu \cdot \eta \cdot (t - t_0)\} & |\theta_0| \le \dfrac{T_0}{2} \\ 0 & \text{OTHER THAN THE ABOVE} \end{cases}$$

The following equation is established by one more time differentiation.

$$R'(t) = \begin{cases} \eta^2 \cdot \mu & |\theta_0| \le \dfrac{T_0}{2} \\ 0 & \text{OTHER THAN THE ABOVE} \end{cases}$$

Therefore, the following equation is established.

$$R'(t)/\mu = \begin{cases} \eta^2 & |\theta_0| \le \dfrac{T_0}{2} \\ 0 & \text{OTHER THAN THE ABOVE} \end{cases}$$

Because $\mu$ is known in advance, a coefficient $\eta$ of a Doppler shift is obtained from this square root.

Next, a case where an instantaneous frequency becomes negative is also considered.

When an instantaneous frequency becomes negative, $R(t)$ is as follows.

$$R(t) = \begin{cases} -\eta\{\omega + \mu \cdot \eta \cdot (t - t_0)\} & |\theta_0| \le \dfrac{T_0}{2} \\ 0 & \text{OTHER THAN THE ABOVE} \end{cases}$$

When this is time-differentiated one time, the following equation is established.

$$R'(t) = \begin{cases} -\eta^2 \cdot \mu & |\theta_0| \le \dfrac{T_0}{2} \\ 0 & \text{OTHER THAN THE ABOVE} \end{cases}$$

Therefore, the following equation is established.

$$R'(t)/\mu = \begin{cases} -\eta^2 & |\theta_0| \le \dfrac{T_0}{2} \\ 0 & \text{OTHER THAN THE ABOVE} \end{cases}$$

Herein, when an absolute value is taken for $R'(t)$, the following equation can be obtained, whether an instantaneous frequency is positive or negative.

$$|R'(t)|/\mu = \begin{cases} \eta^2 & |\theta_0| \le \dfrac{T_0}{2} \\ 0 & \text{OTHER THAN THE ABOVE} \end{cases}$$

An operation according to the present example embodiment is described. First, the transmission waveform setting means 101 sets, for example, based on a setting operation of a transmission waveform by a user, a transmission waveform $St(t)$ as represented below, and stores the transmission waveform $St(t)$.

$$St(t) = \begin{cases} B \cdot \exp\left(j\omega t + \dfrac{j\mu t^2}{2}\right) & |t| \le \dfrac{T_0}{2} \\ 0 & \text{OTHER THAN THE ABOVE} \end{cases}$$

The transmission means 102 transmits a transmission wave having the transmission waveform $St(t)$.

Next, a wave emitted by the transmission means 102 including reflection from a target enters the reception means 103. The reception means 103 converts, into a digital electric signal, an analog electric signal based on the entering wave, and then outputs a reception signal.

Then, the Doppler shift estimation means 104 estimates a Doppler shift, based on the reception waveform $Sr(t)$. In the present example embodiment as well, the differentiation means 204 time-differentiates the reception waveform $Sr(t)$, and then outputs the time differentiation $Sr'(t)$ of the reception waveform. And the ratio calculation means 205 calculates $R(t)$ being an absolute value of a ratio of the reception waveform $Sr(t)$ to the time differentiation $Sr'(t)$ thereof.

Then, in the present example embodiment, the coefficient calculation means 607 obtains a coefficient $\eta$ of a Doppler shift, using a known angular frequency change rate $\mu$, by Equation (22).

As in the other example embodiments described above, the transmission waveform deformation means 105 generates and stores a deformed transmission waveform $1/\eta \times St(t)$ in which the transmission waveform $St(t)$ is multiplied by $1/\eta$.

Then, the target sensing means 106 performs correlation processing between the reception waveform $Sr(t)$ and the deformed transmission waveform $1/\eta \times St(t)$, and determines whether a target is sensed. For example, when a value after the correlation processing is more than a previously stored threshold value, the target sensing means 106 determines that a target is present, and displays a sensing result.

According to the present example embodiment, an advantageous effect similar to that in the other example embodiments described above can be obtained, when a transmission waveform $St(t)$ of LFM which performs frequency modulation represented by a first order polynomial expression in terms of time is set.

Seventh Example Embodiment

Next, a seventh example embodiment of the present invention is described. The seventh example embodiment is an example embodiment corresponding to a case where a transmission waveform is sinusoidal frequency modulation (SFM), and assuming that the transmission waveform $St(t)$ is represented as follows.

$$St(t) = \begin{cases} B \cdot \exp\{j\omega t + \beta\sin(\alpha t)\} & |t| \leq \frac{T_0}{2} \\ 0 & \text{OTHER THAN THE ABOVE} \end{cases}$$

Figure 9:
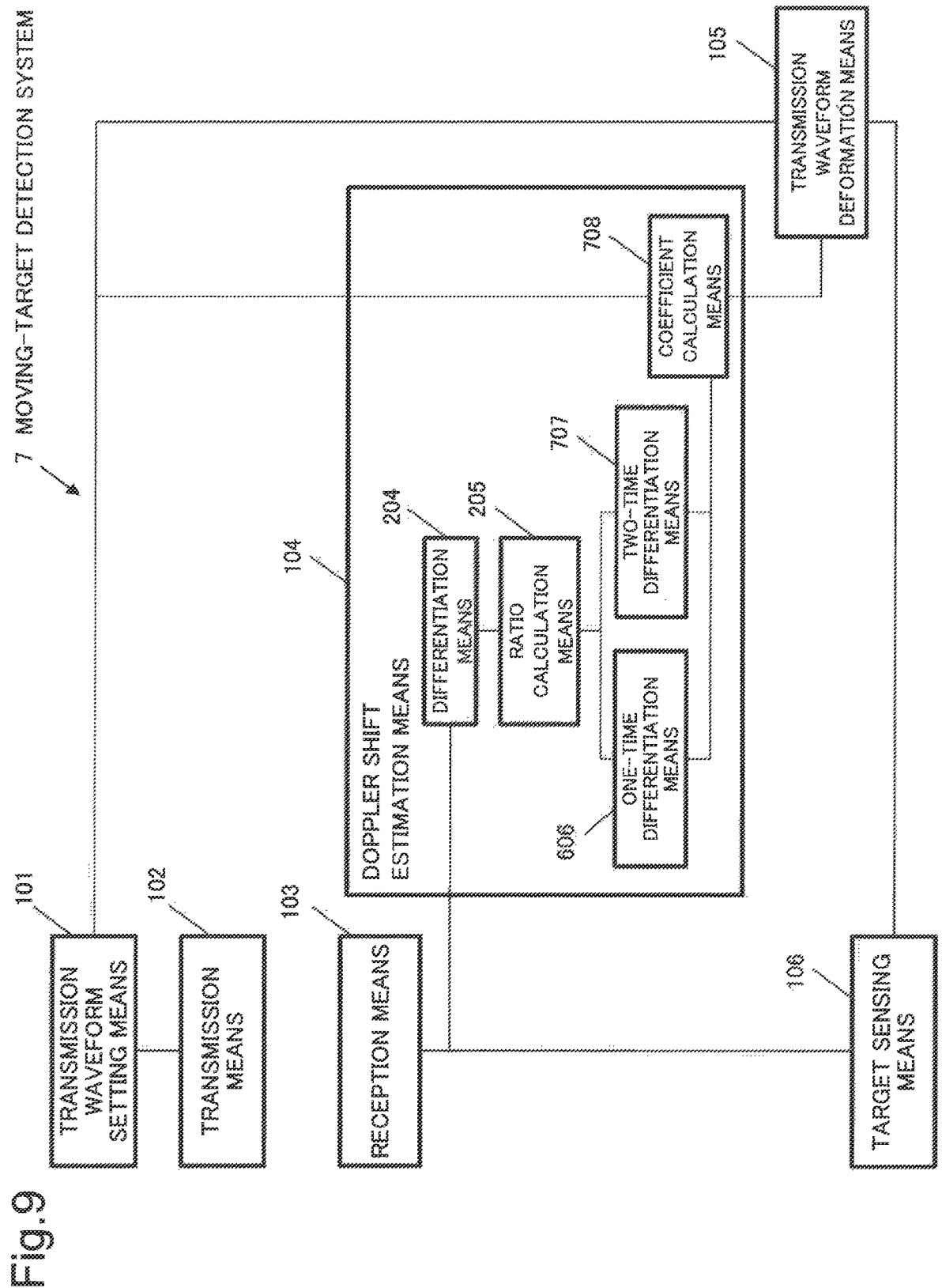
FIG. 9 is a block diagram illustrating a configuration according to a seventh example embodiment of the present invention.

Referring to FIG. 9, in a moving-target detection system 7 according to the seventh example embodiment, the Doppler shift estimation means 104 is different from that in the sixth example embodiment in including a two-time differentiation means 707 for time-differentiating the absolute value $R(t)$ of a ratio of the time-differentiated reception waveform $Sr'(t)$ to the reception waveform $Sr(t)$ two times. Moreover, a coefficient calculation means 708 estimates a Doppler shift by adding the transmission waveform $St(t)$ known in advance to a result $R'(t)$ of one time time-differentiation by the one-time differentiation means 606 and a result $R''(t)$ of two times time-differentiations by the two-time differentiation means 707.

The two-time differentiation means 707 time-differentiates the absolute value $R(t)$ of a ratio of the time-differentiated reception waveform $Sr'(t)$ to the reception waveform $Sr(t)$ only two times, and obtains $R''(t)$.

For example, when the transmission waveform $St(t)$ is represented as described above, the coefficient calculation means 708 obtains a Doppler coefficient $\eta$ by Equation (24) below, using a known modulation angular frequency $\alpha$ and modulation amplitude $\beta$.

$$\eta = \sqrt{\frac{\left(\frac{\sqrt{[27\{R''(t)\}^4 - 4\{R'(t)\}^6/\beta^2]}}{2 \cdot 3^{3/2}\alpha^6\beta^2} + \frac{\{R''(t)\}^2}{2\alpha^6\beta^2}\right)^{1/3} + \frac{\{R'(t)\}^2}{3\alpha^2\left(\frac{\beta^4\sqrt{[27\{R''(t)\}^4 - 4\{R'(t)\}^6/\beta^2]}}{2 \cdot 3^{3/2}} + \frac{\beta^4\{R''(t)\}^2}{2}\right)^{1/3}}}} \quad (24)$$

Equation (24) is derived as follows. For example, when the transmission waveform $St(t)$ is SFM represented as described above, the phase $f(t)$ can be represented as follows.

$$f(t) = \begin{cases} \omega t + \beta\sin(\alpha t) & |t| \leq \frac{T_0}{2} \\ 0 & \text{OTHER THAN THE ABOVE} \end{cases}$$

The reception waveform $Sr(t)$ from a target can be represented as follows.

$$Sr(t) = \begin{cases} A\sqrt{\eta}\exp\left\{j\omega \cdot \eta(t-t_0) + \frac{j\mu \cdot \eta^2(t-t_0)^2}{2}\right\} & |\eta(t-t_0)| \leq \frac{T_0}{2} \\ 0 & \text{OTHER THAN THE ABOVE} \end{cases}$$

Assuming that $\theta_0 = \eta \cdot (t-t_0)$, the phase $f(\theta_0)$ can be represented as follows.

$$f(\theta_0) = \begin{cases} \omega\theta_0 + \beta\sin(\alpha\theta_0) & |\theta_0| \leq \frac{T_0}{2} \\ 0 & \text{OTHER THAN THE ABOVE} \end{cases}$$

Accordingly, the instantaneous frequency $df(\theta_0)/d\theta_0$ can be represented as follows.

$$\frac{df(\theta_0)}{d\theta_0} = \begin{cases} \omega + \alpha\beta\cos(\alpha\theta_0) & |\theta_0| \leq \frac{T_0}{2} \\ 0 & \text{OTHER THAN THE ABOVE} \end{cases}$$

Thus, the absolute value $R(t)$ of a ratio of the time-differentiated reception waveform $Sr'(t)$ to the reception waveform $Sr(t)$ can be represented as follows.

$$R(t) = \begin{cases} \eta\{\omega + \alpha\beta\cos(\alpha\theta_0)\} = \\ \eta[\omega + \alpha\beta\cos\{\alpha\eta(t-t_0)\}] & |\theta_0| \leq \frac{T_0}{2} \\ 0 & \text{OTHER THAN THE ABOVE} \end{cases}$$

The result $R'(t)$ of one more time differentiation can be represented as follows.

$$R'(t) = \begin{cases} -\eta^2 \cdot \alpha^2\beta\sin(\alpha\eta(t-t_0)) & |\theta_0| \leq \frac{T_0}{2} \\ 0 & \text{OTHER THAN THE ABOVE} \end{cases}$$

The result $R''(t)$ of two times differentiations after one more differentiation can be represented as follows.

$$R''(t) = \begin{cases} -\eta^3 \cdot \alpha^3\beta\cos(\alpha\eta(t-t_0)) & |\theta_0| \leq \frac{T_0}{2} \\ 0 & \text{OTHER THAN THE ABOVE} \end{cases}$$

At $|\theta_0| \leq T_0/2$, the following equation is established.

$$\{\alpha\eta R'(t)\}^2 + \{R''(t)\}^2 = \eta^6 \cdot \alpha^6\beta^2 \sin^2(\alpha(t-t_0)) + \eta^6 \cdot \alpha^6\beta^2 \cos^2(\alpha(t-t_0)) = \eta^6\alpha^6\beta^2 \quad (25)$$

When $\lambda = \eta^2$, this becomes a cubic equation as follows regarding $\lambda$.

$$\lambda^3 \cdot \alpha^6\beta^2 - \lambda\{\alpha R'(t)\}^2 - \{R''(t)\}^2 = 0 \quad (26)$$

When this is solved regarding $\lambda$, there is only one real solution, and Equation (27) below is established.

$$\lambda = \left(\frac{\sqrt{[27\{R''(t)\}^4 - 4\{\alpha R'(t)\}^6/\alpha^6\beta^2]}}{2 \cdot 3^{3/2}\alpha^6\beta^2} + \frac{\{R''(t)\}^2}{2\alpha^6\beta^2}\right)^{1/3} + \quad (27)$$

-continued $$\frac{\{\alpha R'(t)\}^2}{3\alpha^6\beta^2\left(\frac{\sqrt{[27\{R''(t)\}^4-4\{\alpha R'(t)\}^6/\alpha^6\beta^2]}}{2\cdot 3^{3/2}\alpha^6\beta^2}+\frac{\{R''(t)\}^2}{2\alpha^6\beta^2}\right)^{1/3}}=$$

$$\left(\frac{\sqrt{[27\{R''(t)\}^4-4\{\alpha R'(t)\}^6/\alpha^6\beta^2]}}{2\cdot 3^{3/2}\alpha^6\beta^2}+\frac{\{R''(t)\}^2}{2\alpha^6\beta^2}\right)^{1/3}+$$

$$\frac{\{R'(t)\}^2}{3\alpha^2\left(\frac{\beta^4\sqrt{[27\{R''(t)\}^4-4\{R'(t)\}^6/\beta^2]}}{2\cdot 3^{3/2}}+\frac{\beta^4\{R''(t)\}^2}{2}\right)^{1/3}}$$

From this square root, a coefficient η of a Doppler shift is obtained.

When an instantaneous frequency is negative, it is possible to represent as follows.

$$R(t)=\begin{cases}-\eta\{\omega+\alpha\beta\cos(\alpha\theta_0)\}=\\-\eta[\omega+\alpha\beta\cos\{\alpha\eta(t-t_0)\}] & |\theta_0|\le\frac{T_0}{2}\\0 & \text{OTHER THAN THE ABOVE}\end{cases}$$

When this is time-differentiated one time, the following equation is established.

$$R'(t)=\begin{cases}\eta^2\cdot\alpha^2\beta\sin(\alpha\eta(t-t_0)) & |\theta_0|\le\frac{T_0}{2}\\0 & \text{OTHER THAN THE ABOVE}\end{cases}$$

When this is time-differentiated one more time, the following equation is established.

$$R''(t)=\begin{cases}\eta^3\cdot\alpha^3\beta\cos(\alpha\eta(t-t_0)) & |\theta_0|\le\frac{T_0}{2}\\0 & \text{OTHER THAN THE ABOVE}\end{cases}$$

Therefore, the following equation is established, and the same relational equation as that when an instantaneous frequency is positive can be obtained.

$$\{\alpha\eta R'(t)\}^2+\{R''(t)\}^2=\eta^6\cdot\alpha^6\beta^2\sin^2(\alpha(t-t_0))+\eta^6\cdot\alpha^6\beta^2\cos^2(\alpha(t-t_0))=\eta^6\cdot\alpha^6\beta^2 \quad (28)$$

In other words, the following equation can be obtained assuming that $\lambda=\eta^2$ whether an instantaneous frequency is positive or negative, and a coefficient η of a Doppler shift is obtained.

$$\lambda=\left(\frac{\sqrt{[27\{R''(t)\}^4-4\{\alpha R'(t)\}^6/\alpha^6\beta^2]}}{2\cdot 3^{3/2}\alpha^6\beta^2}+\frac{\{R''(t)\}^2}{2\alpha^6\beta^2}\right)^{1/3}+ \quad (29)$$

$$\frac{\{R'(t)\}^2}{3\alpha^2\left(\frac{\beta^4\sqrt{[27\{R''(t)\}^4-4\{R'(t)\}^6/\beta^2]}}{2\cdot 3^{3/2}}+\frac{\beta^4\{R''(t)\}^2}{2}\right)^{1/3}}$$

An operation according to the present example embodiment is described. First, the transmission waveform setting means 101 sets, for example, based on a setting operation of a transmission waveform by a user, a transmission waveform St(t) as represented below, and stores the transmission waveform St(t).

$$St(t)=\begin{cases}B\cdot\exp\{j\omega t+\beta\sin(\alpha t)\} & |t|\le\frac{T_0}{2}\\0 & \text{OTHER THAN THE ABOVE}\end{cases}$$

The transmission means 102 transmits a transmission wave having the transmission waveform St(t).

Next, a wave emitted by the transmission means 102 including reflection from a target enters the reception means 103. The reception means 103 converts, into a digital electric signal, an analog electric signal based on the entering wave, and then outputs a reception signal.

Then, the Doppler shift estimation means 104 estimates a Doppler shift, based on the reception waveform Sr(t). In the present example embodiment as well, the differentiation means 204 time-differentiates the reception waveform Sr(t), and then outputs the time differentiation Sr'(t) of the reception waveform. And the ratio calculation means 205 calculates R(t) being an absolute value of a ratio of the reception waveform Sr(t) to the time differentiation Sr'(t) thereof.

Then, in the present example embodiment, the one-time differentiation means 606 time-differentiates the absolute value R(t) of a ratio of the time-differentiated reception waveform Sr'(t) to the reception waveform Sr(t) only one time, and obtains R'(t). Moreover, the two-time differentiation means 707 time-differentiates the absolute value R(t) of a ratio of the time-differentiated reception waveform Sr'(t) and the reception waveform Sr(t) only two times, and obtains R"(t). Then, the coefficient calculation means 708 obtains a Doppler coefficient η by Equation (29), using R'(t), R"(t), the known modulation angular frequency α, and the modulation amplitude β.

As in the other example embodiments described above, the transmission waveform deformation means 105 generates and stores a deformed transmission waveform 1/η×St(t) in which the transmission waveform St(t) is multiplied by 1/η.

Then, the target sensing means 106 performs correlation processing between the reception waveform Sr(t) and the deformed transmission waveform 1/η×St(t), and determines whether a target is sensed. For example, when a value after the correlation processing is more than a previously stored threshold value, the target sensing means 106 determines that a target is present, and displays a sensing result.

According to the present example embodiment, an advantageous effect similar to that in the other example embodiments described above can be obtained, when a transmission waveform St(t) of SFM is set as described above.

Eighth Example Embodiment

Next, an example embodiment achieved by a different obtaining method in the case of SFM is described.

First, a case where an instantaneous frequency is positive is again assumed. From the above-described relational equation, the following equation is established at $|\theta_0|\le T_0/2$.

$$R(t) =$$

$$\begin{cases} \eta[\omega + \alpha\beta\cos\{\alpha\eta(t - t_0)\}] = \eta\left\{\omega - \dfrac{R''(t)}{\alpha^2\eta^2}\right\} & |\theta_0| \leq \dfrac{T_0}{2} \\ 0 & \text{OTHER THAN THE ABOVE} \end{cases}$$

When both sides are multiplied by $\eta^2$, Equation (30) below is established.

$$\eta^2 R(t) = \eta^2\omega - \frac{R''(t)}{\alpha^2} \qquad (30)$$

This is a cubic equation regarding $\eta$, there is only one real solution thereof, and a coefficient $\eta$ of Doppler is obtained by the following equation.

$$\eta = \left(\frac{\sqrt{\dfrac{R''(t)}{\alpha^2}\left(27\omega^2\dfrac{R''(t)}{\alpha^2} + 4\{R(t)\}^3\right)}}{2 \cdot 3^{3/2}\omega^2} + \frac{27\omega^2\dfrac{R''(t)}{\alpha^2} + 2\{R(t)\}^3}{54\omega^3}\right)^{1/3} + \frac{\{R(t)\}^2}{9\omega^2\left(\dfrac{\sqrt{\dfrac{R''(t)}{\alpha^2}\left(27\omega^2\dfrac{R''(t)}{\alpha^2} + 4\{R(t)\}^3\right)}}{2 \cdot 3^{3/2}\omega^2} + \dfrac{27\omega^2\dfrac{R''(t)}{\alpha^2} + 2\{R(t)\}^3}{54\omega^3}\right)^{1/3}} + \frac{R(t)}{3\omega} \qquad (31)$$

When an instantaneous frequency is negative, the following equation is established.

$$R(t) = \begin{cases} -\eta[\omega + \alpha\beta\cos\{\alpha\eta(t - t_0)\}] = \\ \quad -\eta\left\{\omega - \dfrac{R''(t)}{\alpha^2\eta^2}\right\} & |\theta_0| \leq \dfrac{T_0}{2} \\ 0 & \text{OTHER THAN THE ABOVE} \end{cases}$$

When both sides are multiplied by $\eta^2$, Equation (32) below is established.

$$\eta^2 R(t) = -\eta^2\omega + \frac{R''(t)}{\alpha^2} \qquad (32)$$

This is a cubic equation regarding $\eta$, there is only one real solution thereof, and a coefficient $\eta$ of Doppler is obtained by Equation (33) below.

$$\eta = \left(\frac{\sqrt{\dfrac{R''(t)}{\alpha^2}\left(27\omega^2\dfrac{R''(t)}{\alpha^2} - 4\{R(t)\}^3\right)}}{2 \cdot 3^{3/2}\omega^2} + \frac{27\omega^2\dfrac{R''(t)}{\alpha^2} - 2\{R(t)\}^3}{54\omega^3}\right)^{1/3} + \frac{\{R(t)\}^2}{9\omega^2\left(\dfrac{\sqrt{\dfrac{R''(t)}{\alpha^2}\left(27\omega^2\dfrac{R''(t)}{\alpha^2} - 4\{R(t)\}^3\right)}}{2 \cdot 3^{3/2}\omega^2} + \dfrac{27\omega^2\dfrac{R''(t)}{\alpha^2} - 2\{R(t)\}^3}{54\omega^3}\right)^{1/3}} + \frac{R(t)}{3\omega} \qquad (33)$$

Figure 10:
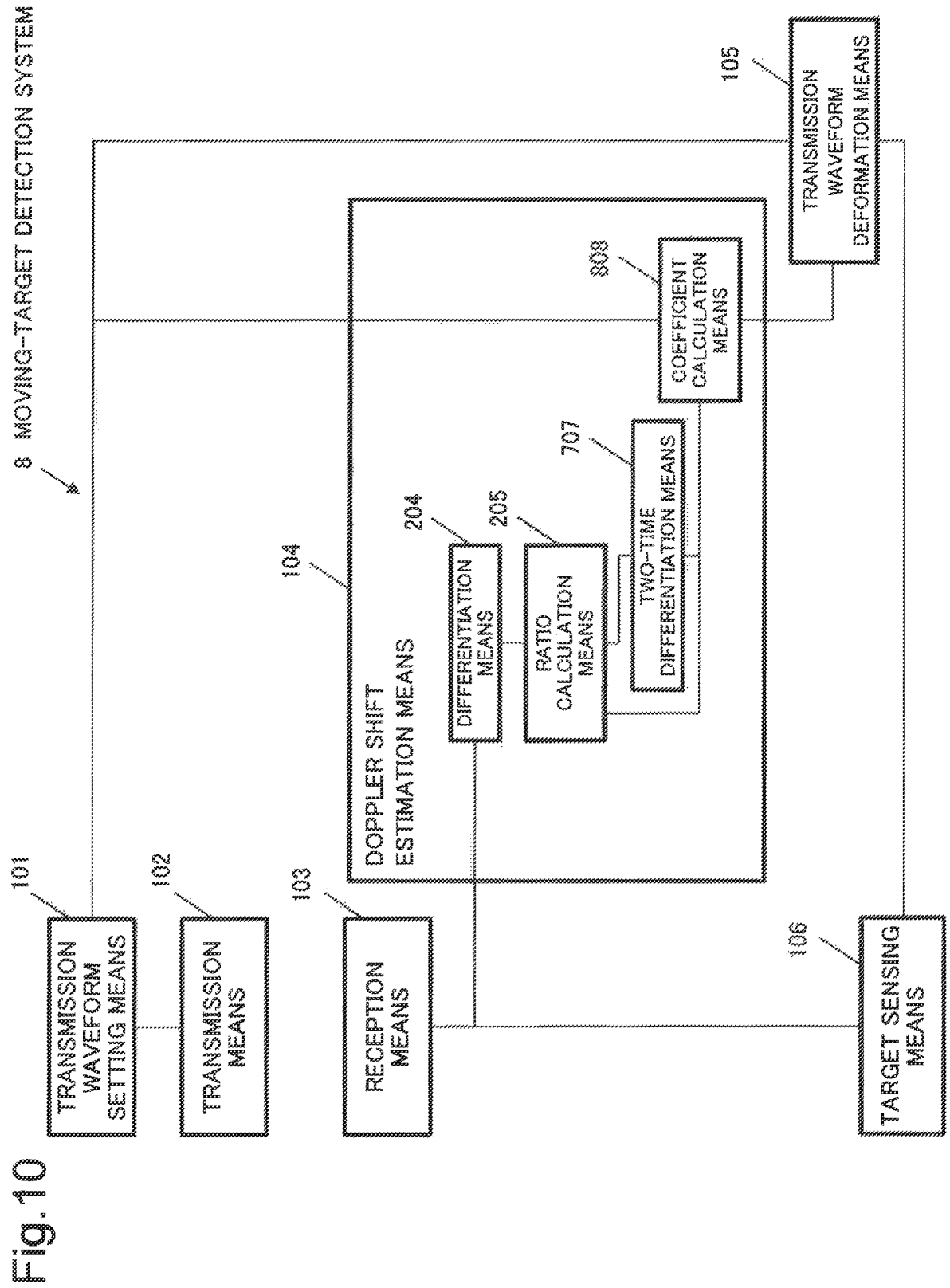
FIG. 10 is a block diagram illustrating a configuration according to an eighth example embodiment of the present invention.

Referring to FIG. 10, in a moving-target detection system 8 according to the eighth example embodiment, the Doppler shift estimation means 104 does not include the one-time differentiation means 606, in contrast to the seventh example embodiment. Moreover, a coefficient calculation means 808 estimates a Doppler shift by adding the transmission waveform St(t) known in advance to the absolute value R(t) of a ratio of the time-differentiated reception waveform Sr'(t) to the reception waveform Sr(t), and the result R"(t) of two times time-differentiations by the two-time differentiation means 707.

According to the present example embodiment, an advantageous effect similar to that in the other example embodiments described above can be obtained, when a transmission waveform St(t) of SFM is set as described above.

Ninth Example Embodiment

Figure 11:
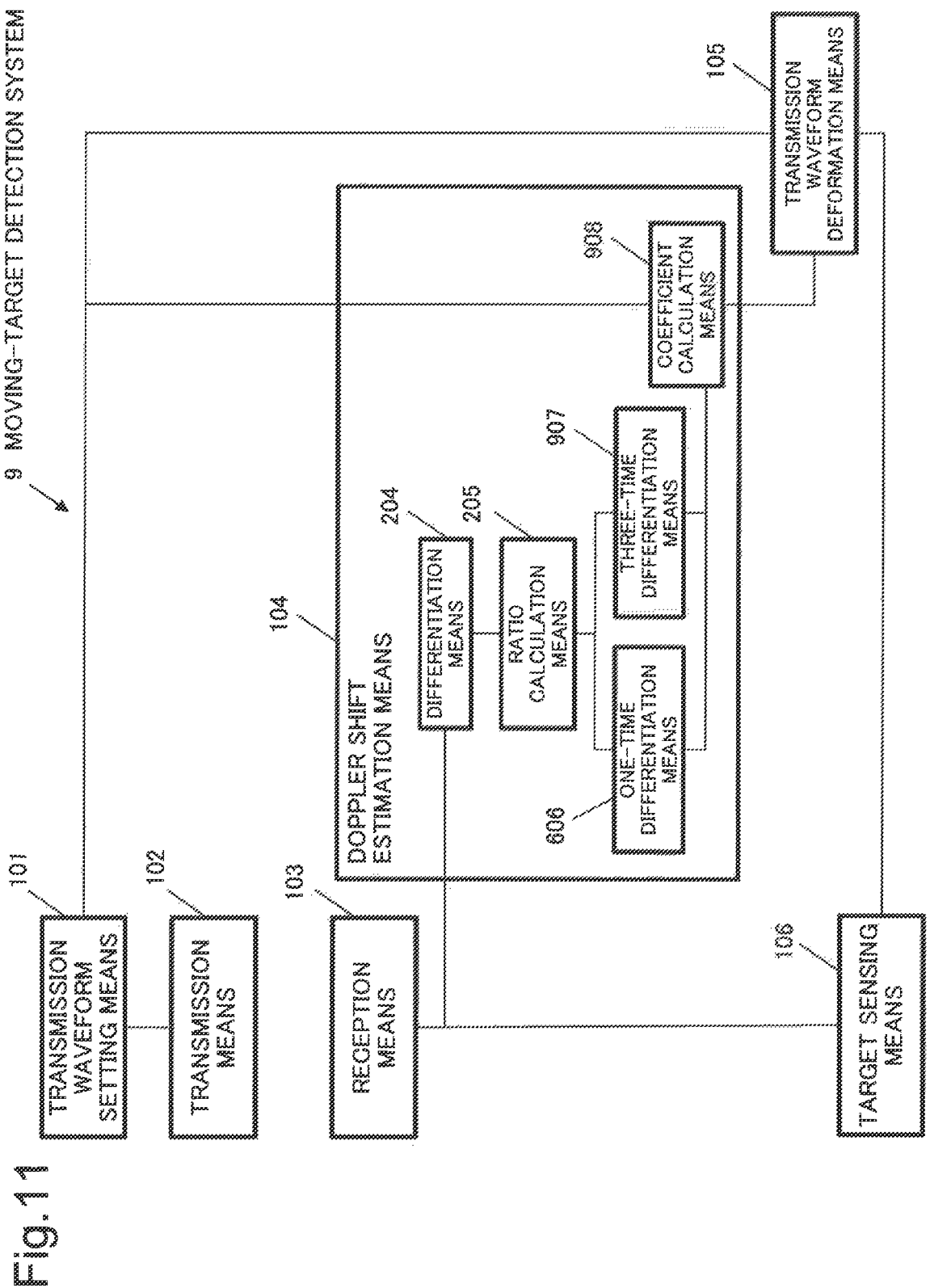
FIG. 11 is a block diagram illustrating a configuration according to a ninth example embodiment of the present invention.

Furthermore, an example embodiment achieved by a different obtaining method in the case of SFM is described. Referring to FIG. 11, in a moving-target detection system 9 according to the ninth example embodiment, the Doppler shift estimation means 104 is different from that in the seventh example embodiment in including, instead of the two-time differentiation means 707, a three-time differentiation means 907 for time-differentiating the absolute value R(t) of a ratio of the time-differentiated reception waveform Sr'(t) to the reception waveform Sr(t) three times. Moreover, a coefficient calculation means 908 estimates a Doppler shift by using the modulation angular frequency $\alpha$ of the transmission waveform St(t) known in advance, for the result R'(t) of one time time-differentiation by the one-time differentiation means 606 and a result $d^3R(t)/dt^3$ of three times time-differentiations by the three-time differentiation means 907.

The three-time differentiation means 907 time-differentiates the absolute value R(t) of a ratio of the time-differentiated reception waveform Sr'(t) to the reception waveform Sr(t) only three times, and obtains $d^3R(t)/dt^3$.

When an instantaneous frequency is positive, the following equation is established.

$$\frac{d^3 R(t)}{dt^3} = \begin{cases} \eta^4 \cdot \alpha^4 \beta\cos(\alpha\eta(t - t_0)) & |\theta_0| \leq \dfrac{T_0}{2} \\ 0 & \text{OTHER THAN THE ABOVE} \end{cases}$$

At $|\theta_0| \leq T_0/2$, Equation (34) below is established.

$$\frac{d^3 R(t)}{dt^3} = -\eta^2 \cdot \alpha^2 R'(t) \qquad (34)$$

Thus, a coefficient $\eta$ of Doppler is obtained by Equation (35) below.

$$\eta = \sqrt{-\frac{\dfrac{d^3}{dt^3} R(t)}{\alpha^2 R'(t)}} \qquad (35)$$

When an instantaneous frequency is negative, the following equation is established.

$$\frac{d^3 R(t)}{dt^3} = \begin{cases} -\eta^4 \cdot \alpha^4 \beta\cos(\alpha\eta(t - t_0)) & |\theta_0| \leq \dfrac{T_0}{2} \\ 0 & \text{OTHER THAN THE ABOVE} \end{cases}$$

As in the case where an instantaneous frequency is positive, Equations (34) and (35) below are established at $|\theta_0| \leq T_0/2$, and a coefficient $\eta$ of Doppler is obtained by Equation (35).

$$\frac{d^3 R(t)}{dt^3} = -\eta^2 \cdot \alpha^2 R'(t) \tag{34}$$

$$\eta = \sqrt{-\frac{\frac{d^3}{dt^3} R(t)}{\alpha^2 R'(t)}} \tag{35}$$

According to the present example embodiment, an advantageous effect similar to that in the other example embodiments described above can be obtained, when a transmission waveform St(t) of SFM is set as described above.

Tenth Example Embodiment

Next, a tenth example embodiment of the present invention is described. The tenth example embodiment is an example embodiment corresponding to a case where the transmission waveform St(t) is frequency hopping (FH), and assuming that St(t) and Pn(t) are represented as follows.

$$St(t) = \sum_{n=0}^{N-1} p_n\left(t - nT_s + \frac{T_0}{2}\right) \tag{36}$$

$$p_n(t) = \begin{cases} \exp(j\omega_n t) & 0 \leq t \leq T_s \\ 0 & \text{OTHER THAN THE ABOVE} \end{cases}$$

$$N \cdot T_s = T_0$$

Figure 12:
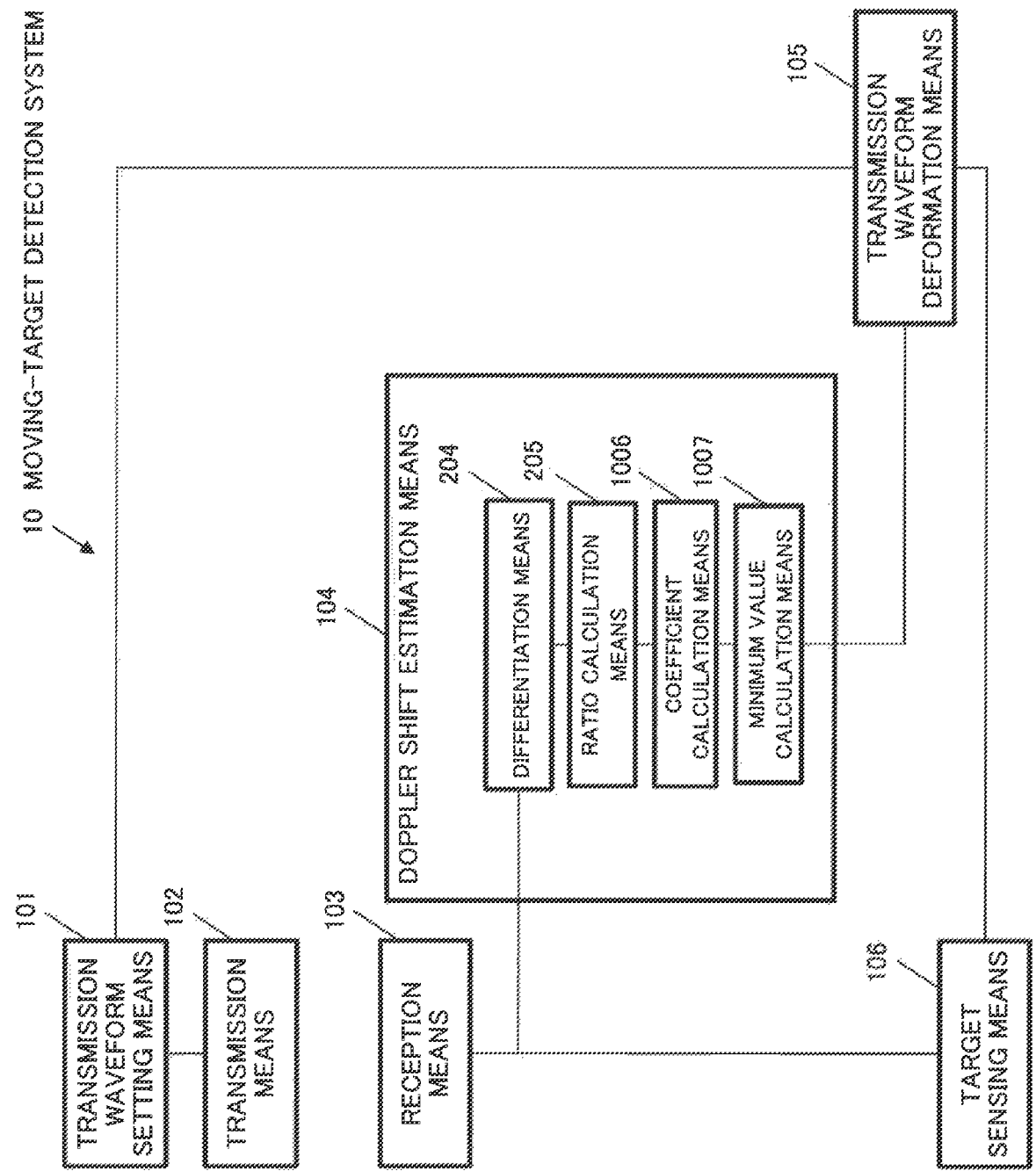
FIG. 12 is a block diagram illustrating a configuration according to a tenth example embodiment of the present invention.

Referring to FIG. 12, in a moving-target detection system 10 according to the tenth example embodiment, the Doppler shift estimation means 104 includes a coefficient calculation means 1006 for estimating a Doppler shift for each of cases of a plurality of frequencies. The Doppler shift estimation means 104 also includes a minimum value calculation means 1007 for selecting, as an optimum Doppler shift, a Doppler shift in which an absolute value of a difference from a frequency in a case of no Doppler shift becomes minimum, among a plurality of obtained Doppler shifts. In addition, the moving-target detection system 10 includes a transmission waveform deformation means 105 for generating and storing a deformed transmission waveform deformed by an obtained optimum Doppler shift.

The coefficient calculation means 1006 obtains a coefficient $\eta$ of a Doppler shift by Equation (37), for each sub-pulse $p_n(t)$ of FH defined as described above.

$$\eta = R(t)/\omega_n \tag{37}$$

The minimum value calculation means 1007 searches for a combination with a frequency at which an absolute value of a difference between a frequency of a sub-pulse by a Doppler shift and a frequency of an original sub-pulse becomes minimum. In other words, for example, when n to be Expression (38) below becomes n=k, a coefficient $\eta$ of a Doppler shift is obtained by Equation (39).

$$\min_n(|R(t) - \omega_n|) \tag{38}$$

$$\eta = R(t)/\omega_k \tag{39}$$

For the transmission waveform St(t) stored in the transmission waveform setting means 101, the transmission waveform deformation means 105 generates and stores, based on a Doppler shift estimated by the minimum value calculation means 1007, a deformed transmission waveform deformed by the Doppler shift. The transmission waveform deformation means 105 deforms the transmission waveform St(t) in accordance with, for example, the coefficient $\eta$ of the Doppler shift in Equation (39).

For example, in the case of FH represented as described above, a plurality of PCWs having a same pulse length are successively transmitted as the sub-pulses $p_n(t)$. Therefore, by considering in a way similar to the case of a PCW, a coefficient of a Doppler shift can be obtained as Equation (37) for each sub-pulse.

Figure 13:
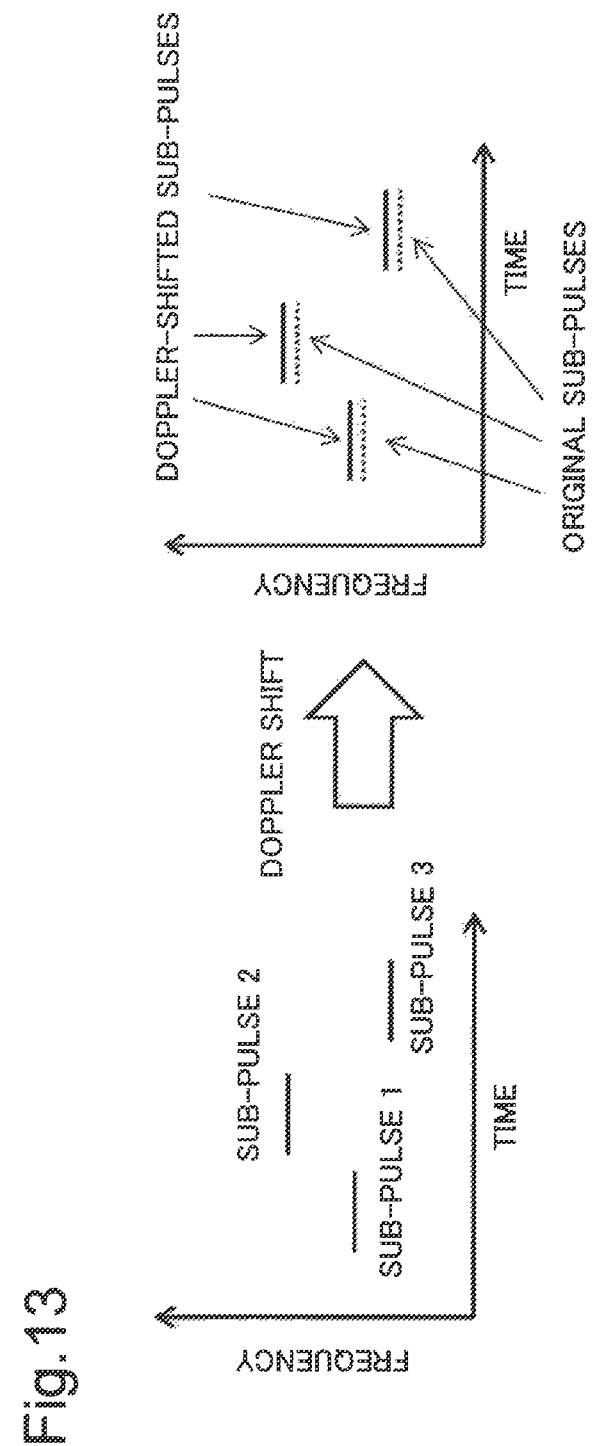
FIG. 13 is a diagram illustrating an example of a Doppler shift in each sub-pulse.

However, a frequency of a sub-pulse seen at this moment is unknown. Considering that a sub-pulse is designed in such a way that a frequency does not become the same within an assumed Doppler shift range, for example, as illustrated in FIG. 13, it is appropriate to search for a combination with a frequency at which an absolute value of a difference between a frequency of a sub-pulse by a Doppler shift and a frequency of an original sub-pulse becomes minimum. In other words, for example, n to be Expression (38), when n=k, results in Equation (39). In this case as well, considering that there is noise, averaging within a range of a most contracted sub-pulse length estimated from an assumed Doppler shift is implemented.

As described above, the moving-target detection system 10 according to the present example embodiment corresponds to a case where the transmission waveform St(t) is FH. When St(t) and Pn(t) are set as represented below, time differentiation Sr'(t) is obtained by time-differentiating the reception waveform Sr(t), the absolute value R(t) of a ratio of the time differentiation Sr'(t) to the reception waveform Sr(t) is obtained, and, for each sub-pulse $p_n(t)$ of FH defined as described above, a coefficient of a Doppler shift is obtained by Equation (37), using each known frequency $\omega_n$.

$$St(t) = \sum_{n=0}^{N-1} p_n\left(t - nT_s + \frac{T_0}{2}\right) \tag{36}$$

$$p_n(t) = \begin{cases} \exp(j\omega_n t) & 0 \leq t \leq T_s \\ 0 & \text{OTHER THAN THE ABOVE} \end{cases}$$

$$N \cdot T_s = T_0$$

Then, the moving-target detection system 10 searches for a combination with a frequency at which an absolute value of a difference between a frequency of a sub-pulse by a Doppler shift and a frequency of an original sub-pulse becomes minimum. When an absolute value of a difference between a frequency of a sub-pulse by a Doppler shift and a frequency of an original sub-pulse becomes minimum with n being n=k, the moving-target detection system 10 obtains a Doppler coefficient $\eta$ by Equation (39) above. Then, the moving-target detection system 10 generates the deformed transmission waveform $1/\eta \times St(t)$, based on the estimated Doppler shift coefficient $\eta$, performs correlation processing with the reception waveform Sr(t), and then determines target sensing.

According to the present example embodiment, an advantageous effect similar to that in the other example embodiments described above can be obtained, when a transmission waveform St(t) of FH is set as described above.

Eleventh Example Embodiment

Next, an eleventh example embodiment of the present invention is described. The eleventh example embodiment corresponds to a given transmission waveform as in the second and third example embodiments, and also corresponds to a case where a reception signal is not converted into a complex number.

Figure 14:
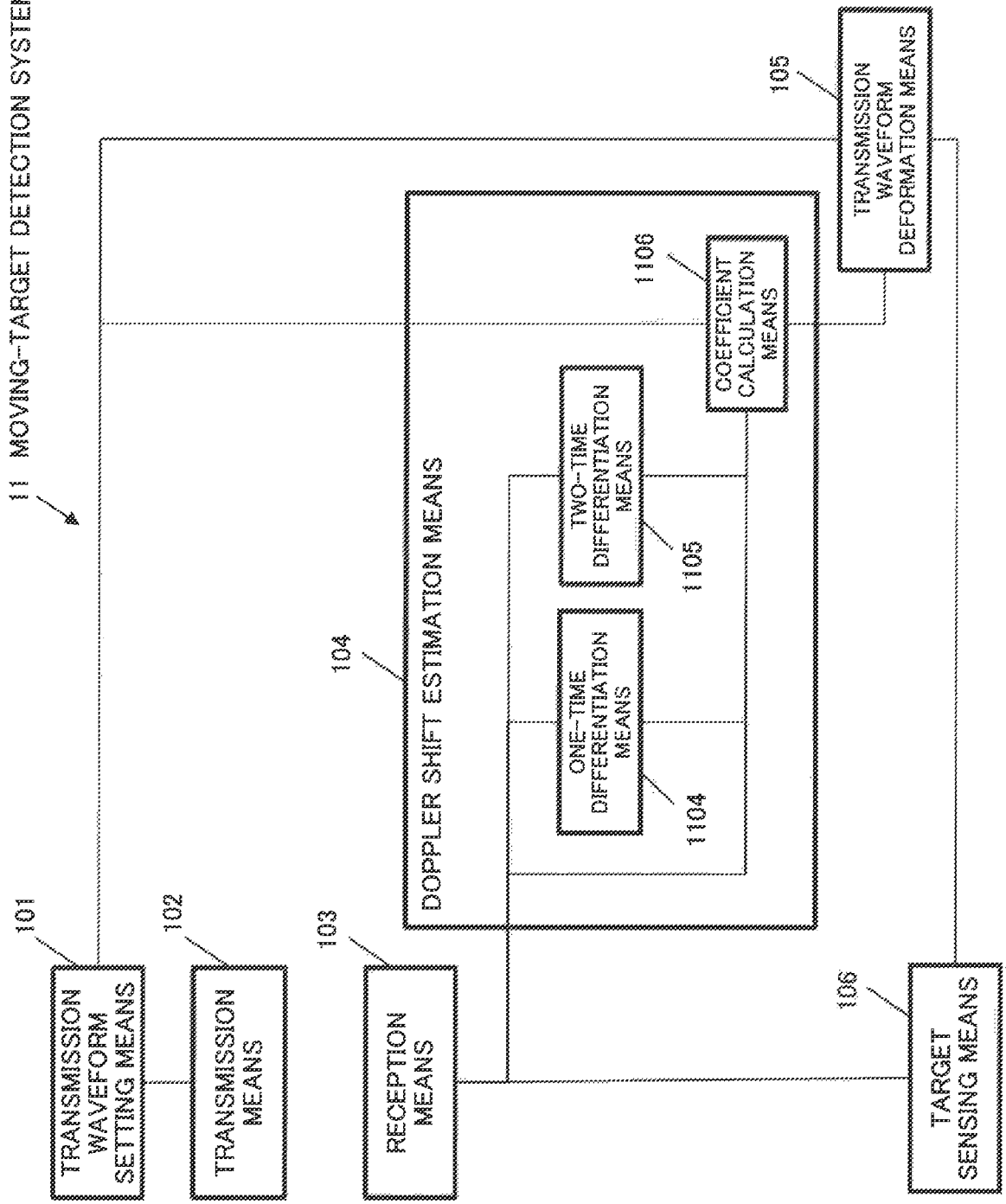
FIG. 14 is a block diagram illustrating a configuration according to an eleventh example embodiment of the present invention.

Referring to FIG. 14, in a moving-target detection system 11 according to the eleventh example embodiment, the Doppler shift estimation means 104 includes a one-time differentiation means 1104 for time-differentiating the reception waveform Sr(t) one time, and a two-time differentiation means 1105 for time-differentiating the reception waveform Sr(t) two times. The Doppler shift estimation means 104 also includes a coefficient calculation means 1106 for calculating a Doppler shift from the reception waveform Sr(t), one time time-differentiation Sr'(t) obtained by time-differentiating the reception waveform Sr(t) one time, two times time-differentiations Sr"(t) obtained by time-differentiating the reception waveform Sr(t) two times, an assumed target position, and the transmission waveform St(t).

The one-time differentiation means 1104 time-differentiates the reception waveform Sr(t) one time, and obtains Sr'(t). The two-time differentiation means 1105 time-differentiates the reception waveform Sr(t) two times, and obtains Sr"(t).

In the present example embodiment, the transmission waveform St(t) is assumed to be represented as follows.

$$St(t) = \begin{cases} B \cdot \sin\{f(t-t_0)\} & |t| \leq \frac{T_0}{2} \\ 0 & \text{OTHER THAN THE ABOVE} \end{cases}$$

Then, the moving-target detection system 11 according to the present example embodiment obtains $\eta$ and $t_0$ being unknown quantities by functional fitting such as a least squares method, using Sr(t), S'(t), and S"(t) obtained from measured data, based on a fact that Equation (40) below is established assuming that $\theta_0 = \eta \cdot (t-t_0)$.

$$\frac{dS'r(t)}{dt} = -Sr(t) \cdot \eta^2 \cdot \left\{\frac{df(\theta_0)}{d\theta_0}\right\}^2 + S'r(t) \cdot \eta \cdot \frac{d^2f(\theta_0)}{d\theta_0^2} \bigg/ \frac{df(\theta_0)}{d\theta_0} \quad (40)$$

This Equation (40) is derived as follows.

The reception waveform Sr(t) from a Doppler-shifted target is represented as in Equation (3) by real number notation.

$$Sr(t) = A\sqrt{\eta} \cdot \sin\{f(\eta \cdot (t-t_0))\} \quad (3)$$

From this time differentiation, Equation (41) below is established assuming that $\theta_0 = \eta \cdot (t-t_0)$.

$$\frac{dSr(t)}{dt} = S'r(t) \quad (41)$$
$$= A\sqrt{\eta} \cdot \cos\{f(\eta \cdot (t-t_0))\} \cdot \eta \cdot \frac{df(\theta_0)}{d\theta_0}$$

Equation (42) below can be obtained by one more time differentiation.

$$\frac{dS'r(t)}{dt} = S''r(t) \quad (42)$$
$$= -A\sqrt{\eta} \cdot \sin\{f(\eta \cdot (t-t_0))\} \cdot \eta^2 \cdot \left\{\frac{df(\theta_0)}{d\theta_0}\right\}^2 +$$
$$A\sqrt{\eta} \cdot \cos\{f(\eta \cdot (t-t_0))\} \cdot \eta^2 \cdot \frac{d^2f(\theta_0)}{d\theta^2}$$
$$= -Sr(t) \cdot \eta^2 \cdot \left\{\frac{df(\theta_0)}{d\theta_0}\right\}^2 + Sr'(t) \cdot \eta \cdot$$
$$\frac{d^2f(\theta_0)}{d\theta_0^2} \bigg/ \frac{df(\theta_0)}{d\theta_0}$$

Herein, $df(\theta_0)/d\theta_0$ and $d^2f(\theta_0)/d\theta_0^2$ are functions regarding $\eta$, and do not become a quadratic equation regarding $\eta$. $\eta$ and $t_0$ being unknown quantities are obtained by functional fitting such as a least squares method, using Sr(t), S'(t), and S"(t) obtained from actually measured data. A principle of functional fitting is the same as that in the case of a complex number.

According to the present example embodiment, an advantageous effect similar to that in the other example embodiments described above can be obtained, when a transmission waveform St(t) is set as described above.

Twelfth Example Embodiment

Next, a twelfth example embodiment of the present invention is described. The twelfth example embodiment is an example embodiment corresponding to a PCW which is not converted into a complex number, and assuming that a transmission waveform St(t) is represented as follows.

$$St(t) = \begin{cases} B \cdot \sin\{\omega t\} & |t| \leq \frac{T_0}{2} \\ 0 & \text{OTHER THAN THE ABOVE} \end{cases}$$

Figure 15:
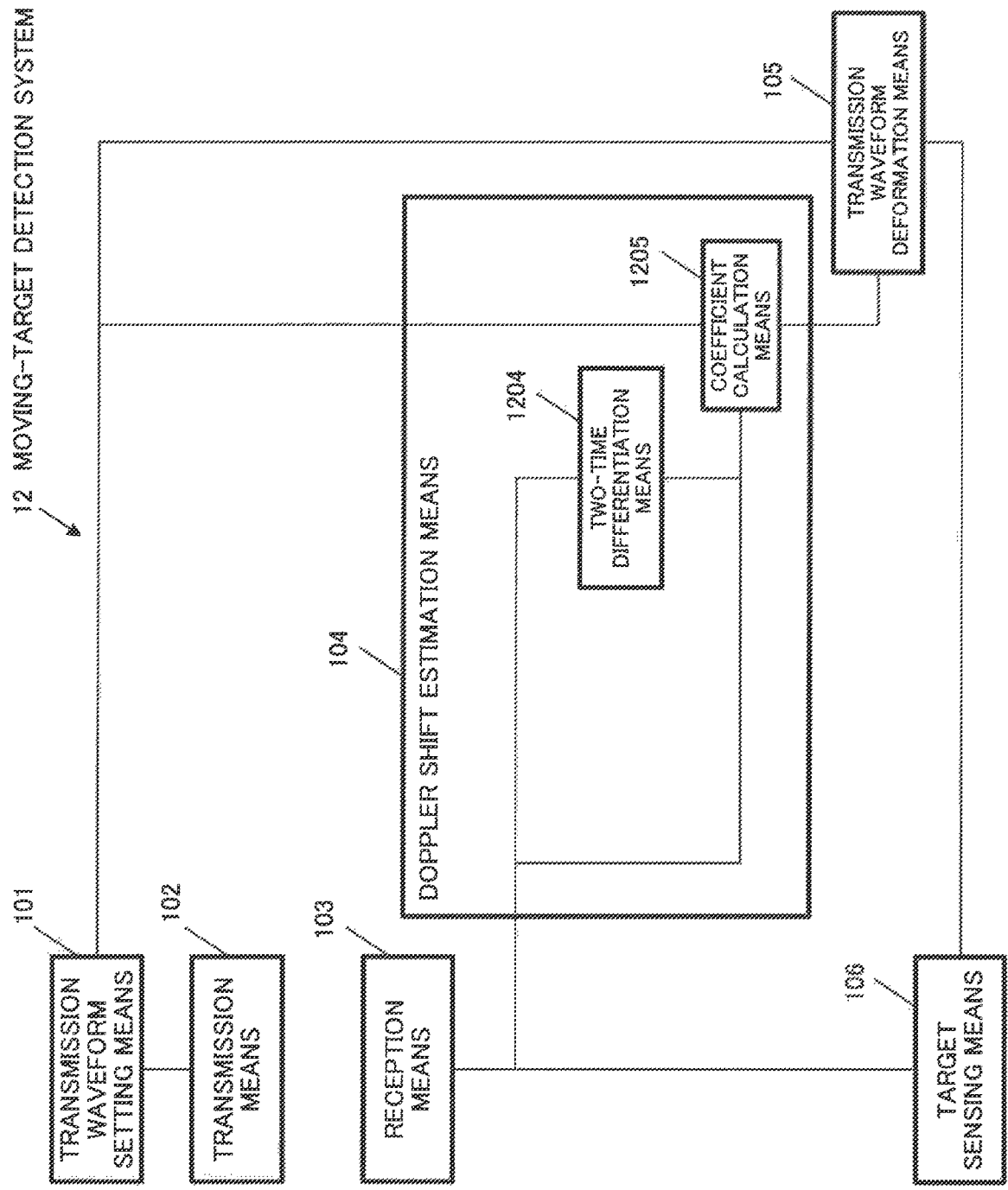
FIG. 15 is a block diagram illustrating a configuration according to a twelfth example embodiment of the present invention.

Referring to FIG. 15, in a moving-target detection system 12 according to the twelfth example embodiment, the Doppler shift estimation means 104 does not include the one-time differentiation means 1104 according to the eleventh example embodiment, and includes a two-time differentiation means 1204 for time-differentiating the reception waveform Sr(t) two times, and a coefficient calculation means 1205 for calculating a Doppler shift from the reception waveform Sr(t), Sr"(t) obtained by time-differentiating the reception waveform Sr(t) two times, and the transmission waveform St(t).

When the transmission waveform St(t) is represented as described above, the coefficient calculation means 1205 obtains a coefficient $\eta$ of a Doppler shift by Equation (43) below. This calculation method is also applicable when an input is a complex number.

$$\eta = \sqrt{-\frac{Sr''(t)}{\omega^2 Sr(t)}} \quad (43)$$

Equation (43) is derived as follows. A case where the transmission waveform St(t) is a PCW below is considered.

$$St(t) = \begin{cases} B \cdot \sin\{\omega t\} & |t| \leq \dfrac{T_0}{2} \\ 0 & \text{OTHER THAN THE ABOVE} \end{cases}$$

Assuming that a pulse of $t=t_0$ is returned from a target, Equation (44) below is established.

$$Sr(t) = A\sqrt{\eta} \cdot \sin\{\eta\omega(t-t_0)\} \tag{44}$$

By this time differentiation, Equation (45) below can be obtained.

$$Sr'(t) = \eta\omega A\sqrt{\eta}\cos\{\eta\omega(t-t_0)\} \tag{45}$$

Equation (46) below can be obtained by one more time differentiation.

$$Sr''(t) = -\eta^2\omega^2 A\sqrt{\eta}\sin\{\eta\omega(t-t_0)\} = -\eta^2\omega^2 S(t) \tag{46}$$

From this Equation (46), Equation (47) below is established.

$$\eta^2 = -\dfrac{Sr''(t)}{\omega^2 Sr(t)} \tag{47}$$

Therefore, the coefficient calculation means 1205 can calculate a coefficient η of a Doppler shift by Equation (43) above.

According to the present example embodiment, an advantageous effect similar to that in the other example embodiments described above can be obtained, when a transmission waveform St(t) of PCW which is not converted into a complex number is set as described above.

While the invention of the present application is described above with reference to example embodiments thereof, the invention of the present application is not limited to the example embodiments described above. Various modifications that may be understood by a person skilled in the art can be made to configurations and details of the invention of the present application within the scope of the invention of the present application.

For example, a moving-target detection system may sequentially implement an example embodiment to which the moving-target detection system is applicable among the example embodiments described above, in a predetermined order, by setting of the transmission waveform St(t), until a coefficient η of a Doppler shift can be obtained.

Furthermore, a moving-target detection system may sequentially implement a plurality of example embodiments described above, obtain coefficients η of a plurality of Doppler shifts, and select one of the coefficients η.

Still further, a moving-target detection system may use, as a coefficient η of a Doppler shift, an average value of coefficients η of a plurality of Doppler shifts obtained in the respective example embodiments.

Further yet, a moving-target detection system may sequentially implement a plurality of example embodiments in a predetermined order, independently of setting of the transmission waveform St(t), until a coefficient η of a Doppler shift can be obtained.

While the present invention is described above with reference to example embodiments thereof, the present invention is not limited to the example embodiments described above. Various modifications that may be understood by a person skilled in the art can be made to configurations and details of the present invention within the scope of the present invention.

Some or all of the example embodiments described above may be described as, but not limited to, the following supplementary notes.

(Supplementary note 1) A moving-target detection system including: a transmission waveform setting means for setting a transmission waveform; a transmission means for transmitting a wave having the set transmission waveform; a reception means for receiving a wave including a reflected wave from a target; a Doppler shift estimation means for estimating a Doppler shift that occurs due to movement of the target, from the transmission waveform and a reception waveform of a wave including the reflected wave; a transmission waveform deformation means for generating a deformed transmission waveform in which the transmission waveform is deformed, according to the estimated Doppler shift; and a target sensing means for sensing a target by using the deformed transmission waveform.

(Supplementary note 2) The moving-target detection system according to Supplementary note 1, wherein the Doppler shift estimation means includes a differentiation means for time-differentiating the reception waveform, a ratio calculation means for calculating an absolute value of a ratio of a time differentiation waveform in which the reception waveform is time-differentiated, to the reception waveform, and a least squares means for performing least squares fitting of the deformed transmission waveform to an absolute value of a ratio of the time differentiation waveform to the reception waveform, and estimating the Doppler shift.

(Supplementary note 3) The moving-target detection system according to Supplementary note 2, wherein the least squares means calculates, by the least squares fitting, a Doppler shift coefficient η from an N-th order coefficient, when an instantaneous frequency of the transmission waveform is represented by an N-th order (N is a positive integer) polynomial expression of time in terms of time.

(Supplementary note 4) The moving-target detection system according to Supplementary note 1, wherein the Doppler shift estimation means includes a differentiation means for time-differentiating the reception waveform, a ratio calculation means for calculating an absolute value of a ratio of a time differentiation waveform in which the reception waveform is time-differentiated, to the reception waveform, a multiple differentiation means for time-differentiating an absolute value of a ratio of the time differentiation waveform to the reception waveform a plurality of times, and a first coefficient calculation means for estimating the Doppler shift from a result of time-differentiating a plurality of times and the transmission waveform.

(Supplementary note 5) The moving-target detection system according to Supplementary note 1, wherein the Doppler shift estimation means includes a differentiation means for time-differentiating the reception waveform, a ratio calculation means for calculating an absolute value of a ratio of a time differentiation waveform in which the reception waveform is time-differentiated, to the reception waveform, and a second coefficient calculation means for estimating the Doppler shift from an absolute value of a ratio of the time differentiation waveform to the reception waveform, and the transmission waveform.

(Supplementary note 6) The moving-target detection system according to Supplementary note 1, wherein the Doppler shift estimation means includes a differentiation means for time-differentiating the reception waveform, a ratio calculation means for calculating an absolute value of a ratio of a time differentiation waveform in which the reception waveform is time-differentiated, to the reception waveform, a one-time differentiation means for time-differentiating an absolute value of a ratio of the time differentiation waveform to the reception waveform only one time, and a third coefficient calculation means for estimating the Doppler shift from a result of time-differentiating one time and the transmission waveform.

(Supplementary note 7) The moving-target detection system according to Supplementary note 1, wherein the Doppler shift estimation means includes a differentiation means for time-differentiating the reception waveform, a ratio calculation means for calculating an absolute value of a ratio of a time differentiation waveform in which the reception waveform is time-differentiated, to the reception waveform, a one-time differentiation means for time-differentiating an absolute value of a ratio of the time differentiation waveform to the reception waveform only one time, a two-time differentiation means for time-differentiating an absolute value of a ratio of the time differentiation waveform to the reception waveform two times, and a fourth coefficient calculation means for estimating a Doppler shift by adding the transmission waveform to a result of time-differentiating an absolute value of a ratio of the time differentiation waveform to the reception waveform one time, and a result of time-differentiating an absolute value of a ratio of the time differentiation waveform to the reception waveform two times.

(Supplementary note 8) The moving-target detection system according to Supplementary note 1, wherein the Doppler shift estimation means includes a differentiation means for time-differentiating the reception waveform, a ratio calculation means for calculating an absolute value of a ratio of a time differentiation waveform in which the reception waveform is time-differentiated, to the reception waveform, a two-time differentiation means for time-differentiating an absolute value of a ratio of the time differentiation waveform to the reception waveform two times, and a fifth coefficient calculation means for estimating a Doppler shift by adding the transmission waveform to a ratio of the time differentiation waveform to the reception waveform, and a result of time-differentiating an absolute value of a ratio of the time differentiation waveform to the reception waveform two times.

(Supplementary note 9) The moving-target detection system according to Supplementary note 1, wherein the Doppler shift estimation means includes a differentiation means for time-differentiating the reception waveform, a ratio calculation means for calculating an absolute value of a ratio of a time differentiation waveform in which the reception waveform is time-differentiated, to the reception waveform, a one-time differentiation means for time-differentiating an absolute value of a ratio of the time differentiation waveform to the reception waveform only one time, a three-time differentiation means for time-differentiating an absolute value of a ratio of the time differentiation waveform to the reception waveform three times, and a sixth coefficient calculation means for estimating a Doppler shift by adding the transmission waveform to a result of time-differentiating an absolute value of a ratio of the time differentiation waveform to the reception waveform one time, and a result of time-differentiating an absolute value of a ratio of the time differentiation waveform to the reception waveform three times.

(Supplementary note 10) The moving-target detection system according to Supplementary note 1, wherein the Doppler shift estimation means includes a differentiation means for time-differentiating the reception waveform, a ratio calculation means for calculating an absolute value of a ratio of a time differentiation waveform in which the reception waveform is time-differentiated, to the reception waveform, a seventh coefficient calculation means for estimating, for each of cases of a plurality of frequencies, a plurality of Doppler shifts from an absolute value of a ratio of the time differentiation waveform to the reception waveform, and the transmission waveform, and a minimum value calculation means for selecting, as an optimum Doppler shift, a Doppler shift in which an absolute value of a difference from a frequency in a case of no Doppler shift becomes minimum, among the plurality of obtained Doppler shifts.

(Supplementary note 11) The moving-target detection system according to Supplementary note 1, wherein the Doppler shift estimation means includes a one-time differentiation means for time-differentiating the reception waveform one time, a two-time differentiation means for time-differentiating the reception waveform two times, and an eighth coefficient calculation means for calculating a Doppler shift from the reception waveform, a waveform in which the reception waveform is time-differentiated one time, a waveform in which the reception waveform is time-differentiated two times, an assumed target position, and the transmission waveform.

(Supplementary note 12) The moving-target detection system according to Supplementary note 1, wherein the Doppler shift estimation means includes a two-time differentiation means for time-differentiating the reception waveform two times, and a ninth coefficient calculation means for calculating a Doppler shift from the reception waveform, a waveform in which the reception waveform is time-differentiated two times, and the transmission waveform.

(Supplementary note 13) A moving-target detection method including: setting a transmission waveform; transmitting a wave having a set transmission waveform; receiving an entering wave including a reflected wave from a target; estimating a Doppler shift of a received wave that occurs due to movement of a target, from a transmission waveform and a received waveform; generating a deformed transmission waveform in which a transmission waveform is deformed, according to an estimated Doppler shift; and sensing a target by using a deformed transmission waveform.

(Supplementary note 14) A program causing a computer to execute: processing of setting a transmission waveform; processing of transmitting a wave having a set transmission waveform; processing of receiving an entering wave including a reflected wave from a target; processing of estimating a Doppler shift of a received wave that occurs due to movement of a target, from a transmission waveform and a received waveform; processing of generating a deformed transmission waveform in which a transmission waveform is deformed, according to an estimated Doppler shift; and processing of sensing a target by using a deformed transmission waveform.

REFERENCE SIGNS LIST 1, 2, 3, 4, 5, 6, 7, 8, 9, 10, 11, 12 Moving-target detection system
101, 1301 Transmission waveform setting means
102, 1302 Transmission means
103, 1303 Reception means
104 Doppler shift estimation means
105 Transmission waveform deformation means 106, 1304 Target sensing means
204 Differentiation means
205 Ratio calculation means
206, 306 Least squares means
406 Multiple differentiation means
407, 506, 607, 708, 808, 908, 1006, 1106, 1205 Coefficient calculation means
606, 1104 One-time differentiation means
707, 1105, 1204 Two-time differentiation means
907 Three-time differentiation means
1007 Minimum value calculation means
50 Information processing device
51 CPU
52 ROM
53 RAM
54 Program
55 Storage device
56 Recording medium
57 Drive device
58 Communication interface
59 Communication network
60 Input/output interface
61 Bus

The invention claimed is:

1. A moving-target detection system comprising:
a memory for storing instructions; and
a processor connected to the memory and configured to execute the instructions to:
set a transmission waveform;
transmit a wave from a transmitter having the set transmission waveform;
receive a wave from a receiver, including a reflected wave from a target;
estimate a Doppler shift that occurs due to movement of the target, from the transmission waveform and a reception waveform of a wave including the reflected wave;
generate a deformed transmission waveform in which the transmission waveform is deformed, according to the estimated Doppler shift; and
sense a target by using the deformed transmission waveform,
wherein a time differentiation waveform is determined by time-differentiating the reception waveform, and
wherein the Doppler shift is estimated using at least the time differentiation waveform and the transmission waveform.

2. The moving-target detection system according to claim 1, wherein
the processor is further configured to execute instructions to:
calculate an absolute value of a ratio of the time differentiation waveform to the reception waveform, and
perform least squares fitting of the instantaneous frequency of the transmission waveform to an absolute value of a ratio of the time differentiation waveform to the reception waveform, and estimate the Doppler shift.

3. The moving-target detection system according to claim 2, wherein
the processor is further configured to execute instructions to:
calculate, by the least squares fitting, a Doppler shift coefficient η from an N-th order coefficient, when the instantaneous frequency of the transmission waveform is represented by an N-th order (N is a positive integer) polynomial expression of time in terms of time.

4. The moving-target detection system according to claim 1, wherein
the processor is further configured to execute instructions to:
calculate an absolute value of a ratio of the time differentiation waveform to the reception waveform,
time-differentiate the absolute value of the ratio of the time differentiation waveform to the reception waveform at a plurality of times, and
estimate the Doppler shift from a result of time-differentiating the absolute value of the ratio of the time differentiation waveform to the reception waveform a plurality of times, and the transmission waveform.

5. The moving-target detection system according to claim 1, wherein
the processor is further configured to execute instructions to:
calculate an absolute value of a ratio of the time differentiation waveform to the reception waveform, and
estimate the Doppler shift from the absolute value of the ratio of the time differentiation waveform to the reception waveform, and the transmission waveform.

6. The moving-target detection system according to claim 1, wherein
the processor is further configured to execute instructions to:
calculate an absolute value of a ratio of the time differentiation waveform to the reception waveform,
time-differentiate the absolute value of the ratio of the time differentiation waveform to the reception waveform only one time, and
estimate the Doppler shift from a result of time-differentiating the absolute value of the ratio of the time differentiation waveform to the reception waveform only one time, and the transmission waveform.

7. The moving-target detection system according to claim 1, wherein
the processor is further configured to execute instructions to:
calculate an absolute value of a ratio of the time differentiation waveform to the reception waveform,
time-differentiate the absolute value of the ratio of the time differentiation waveform to the reception waveform only one time,
time-differentiate the absolute value of the ratio of the time differentiation waveform to the reception waveform two times, and
estimate a Doppler shift by adding the transmission waveform to the result of time-differentiating the absolute value of the ratio of the time differentiation waveform to the reception waveform one time, and the result of time-differentiating the absolute value of the ratio of the time differentiation waveform to the reception waveform two times.

8. The moving-target detection system according to claim 1, wherein
the processor is further configured to execute instructions to:
calculate an absolute value of a ratio of the time differentiation waveform to the reception waveform,
time-differentiate the absolute value of the ratio of the time differentiation waveform to the reception waveform two times, and
estimate a Doppler shift by adding the transmission waveform to a ratio of the time differentiation waveform to the reception waveform, and the result of time-differentiating the absolute value of the ratio of the time differentiation waveform to the reception waveform two times.

9. The moving-target detection system according to claim 1, wherein
the processor is further configured to execute instructions to:
calculate an absolute value of a ratio of the time differentiation waveform to the reception waveform,
time differentiate the absolute value of the ratio of the time differentiation waveform to the reception waveform only one time,
time differentiate the absolute value of the ratio of the time differentiation waveform to the reception waveform three times, and
estimate a Doppler shift by adding the transmission waveform to the result of time-differentiating the absolute value of the ratio of the time differentiation waveform to the reception waveform one time, and the result of time-differentiating the absolute value of the ratio of the time differentiation waveform to the reception waveform three times.

10. The moving-target detection system according to claim 1, wherein
the processor is further configured to execute instructions to:
calculate an absolute value of a ratio of a time differentiation waveform to the reception waveform,
estimate, for each of a plurality of frequencies, a plurality of Doppler shifts from the absolute value of the ratio of the time differentiation waveform and the reception waveform, and the transmission waveform, and
select, as an optimum Doppler shift, a Doppler shift in which an absolute value of a difference between a frequency in a case of no Doppler shift and the plurality of obtained Doppler shifts becomes minimum.

11. The moving-target detection system according to claim 1, wherein
the processor is further configured to execute instructions to:
time differentiate the reception waveform one time,
time differentiate the reception waveform two times, and
calculate a Doppler shift from the reception waveform, a waveform in which the reception waveform is time-differentiated one time, a waveform in which the reception waveform is time-differentiated two times, an assumed target position, and the transmission waveform.

12. The moving-target detection system according to claim 1, wherein
the processor is further configured to execute instructions to:
time differentiate the reception waveform two times, and
calculate a Doppler shift from the reception waveform, a waveform in which the reception waveform is time-differentiated two times, and the transmission waveform.

13. A moving-target detection method comprising:
setting a transmission waveform;
transmitting a wave having a set transmission waveform;
receiving an entering wave including a reflected wave from a target;
estimating a Doppler shift of a received wave that occurs due to movement of a target, from a transmission waveform and a received waveform;
generating a deformed transmission waveform in which a transmission waveform is deformed, according to an estimated Doppler shift; and
sensing a target by using a deformed transmission waveform,
wherein a time differentiation waveform is determined by time-differentiating the received waveform, and
wherein the Doppler shift is estimated using at least the time differentiation waveform and the transmission waveform.

14. A non-transitory computer readable recording medium for recording program causing a computer to execute:
setting a transmission waveform;
transmitting a wave having a set transmission waveform;
receiving an entering wave including a reflected wave from a target;
estimating a Doppler shift of a received wave that occurs due to movement of a target, from a transmission waveform and a received waveform;
generating a deformed transmission waveform in which a transmission waveform is deformed, according to an estimated Doppler shift; and
sensing a target by using a deformed transmission waveform,
wherein a time differentiation waveform is determined by time-differentiating the reception waveform, and
wherein the Doppler shift is estimated using at least the time differentiation waveform and the transmission waveform.

* * * * *